(12) United States Patent
Zhang et al.

(10) Patent No.: US 12,317,367 B2
(45) Date of Patent: May 27, 2025

(54) SESSION PROCESSING METHOD AND COMMUNICATION APPARATUS

(71) Applicant: Huawei Technologies Co., Ltd., Shenzhen (CN)

(72) Inventors: Chengchen Zhang, Shanghai (CN); Lin Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 17/814,320

(22) Filed: Jul. 22, 2022

(65) Prior Publication Data

US 2022/0361286 A1     Nov. 10, 2022

Related U.S. Application Data

(63) Continuation of application No. PCT/CN2021/070442, filed on Jan. 6, 2021.

(30) Foreign Application Priority Data

Jan. 23, 2020   (CN) .......................... 202010077054.3

(51) Int. Cl.
*H04W 76/34* (2018.01)
*H04W 76/32* (2018.01)
*H04W 80/10* (2009.01)

(52) U.S. Cl.
CPC ........... *H04W 76/34* (2018.02); *H04W 76/32* (2018.02); *H04W 80/10* (2013.01)

(58) Field of Classification Search
CPC .............................. H04W 76/32; H04W 80/10
See application file for complete search history.

(56) References Cited

U.S. PATENT DOCUMENTS

2009/0034472 A1    2/2009  Purnadi et al.
2015/0078245 A1*   3/2015  Anchan ............. H04W 36/0007
                                                           370/312
(Continued)

FOREIGN PATENT DOCUMENTS

CN      102084705 A     6/2011
CN      105391968 A     3/2016
(Continued)

OTHER PUBLICATIONS

Huawei et al., "Handling of Max number of PDU sessions", 3GPP TSG-CT WG1 Meeting #110, C1-182458, Kunming, China, Apr. 16-20, 2018, 1 page.

(Continued)

*Primary Examiner* — Michael A Keller
(74) *Attorney, Agent, or Firm* — Slater Matsil, LLP

(57) ABSTRACT

Embodiments of this application provide a session processing method and apparatus. When a quantity of sessions of a terminal device that each have an activated user plane connection is not less than a quantity threshold, the terminal device determines to deactivate a user plane connection of at least one first session, where the sessions that each have the activated user plane connection include the at least one first session. The terminal device sends a first request message to a first network element, where the first request message includes indication information, and the indication information indicates to deactivate the user plane connection of the at least one first session.

20 Claims, 11 Drawing Sheets

(56) References Cited

U.S. PATENT DOCUMENTS

2017/0295530 A1* 10/2017 Chen ................... H04W 36/13
2018/0270782 A1    9/2018 Park et al.
2019/0254100 A1*  8/2019 Yu ....................... H04W 76/19

FOREIGN PATENT DOCUMENTS

| CN | 109673046 A | 4/2019 |
| CN | 110519775 A | 11/2019 |
| CN | 112188608 A | 1/2021 |
| CN | 112188643 A | 1/2021 |
| WO | 2018164498 A1 | 9/2018 |
| WO | 2019097086 A1 | 5/2019 |

OTHER PUBLICATIONS

HTC, "Clarification to the CIOT EPS optimisation procedure", 3GPP TSG-CT WG1 Meeting #101, C1-165312, Reno, NV, US, Nov. 14-18, 2016, 3 pages.

Samsung, "Handling the always-on PDU session for UP activation during UE CM-Connected transition (opt. 2)," 3GPP TSG-SA WG2 Meeting #135 S2-1909816, Oct. 14-18, 2019, Split, Croatia, 42 pages.

Oppo, et al., "Handling of maximum No. of allowed active DRBs," 3GPP TSG-CT WG1 Meeting #121, C1-199038, Reno (US), Nov. 11-15, 2019, 2 pages.

* cited by examiner

SESSION PROCESSING METHOD AND COMMUNICATION APPARATUS

CROSS-REFERENCE TO RELATED APPLICATIONS

This is a continuation of International Patent Application No. PCT/CN2021/070442, filed on Jan. 6, 2021, which claims priority to Chinese Patent Application No. 202010077054.3, filed on Jan. 23, 2020. The disclosures of the aforementioned applications are hereby incorporated by reference in their entireties.

TECHNICAL FIELD

The present invention relates to the field of communication technologies, and in particular, to a session processing method and a communication apparatus.

BACKGROUND

A narrow band internet of things (NB-IoT) is a low-power wide-area network radio technology standard. The NB-IoT has advantages such as low power, a wide area, low costs, and a large capacity, and can be widely applied to various vertical industries. Generally, a terminal device that accesses the NB-IoT allows a maximum of a specific quantity of sessions to have activated user plane connections (UP connection). The activated user plane connection is various user-plane resources established by an access network and a user plane core network element for the session, so that user data is transmitted by using the established user plane resources. The activated user plane connection includes various user-plane resources established by a radio access network (RAN), a user plane function network element (UPF), and the like for the session, where the resources include but are not limited to a data radio bearer (DRB) established by the RAN for the session and an N3 tunnel established by the RAN and the UPF for the session. The activated user plane connection further includes various user-plane resources established by an N3 interworking function network element (N3IWF) or a trusted non-3GPP gateway function network element (TNGF), the UPF, and the like for the session, where the resources include but are not limited to an air interface tunnel established by the N3IWF or the TNGF for the session and an N3 tunnel established by the N3IWF or the TNGF, and the UPF for the session. In a conventional technology, when the quantity of sessions of the terminal device that each have the activated user plane connection reaches a quantity threshold, and the terminal device expects to activate a user plane connection of another session, the terminal device selects, for releasing, one or more sessions that each have the activated user plane connection, to reduce the quantity of sessions that each have the activated user plane connection. Because the session is released, session reestablishment is further needed when a user plane connection of the session is subsequently used again. Consequently, signaling is wasted, and a service establishment delay is increased.

In addition to the narrow band internet of things, in another commercial cellular network or wireless network, due to a limitation of an operator on an air interface resource, there is also a requirement for limiting a maximum quantity of sessions of a terminal device that each have an activated user plane connection. When a quantity of sessions of the terminal device that each have the activated user plane connection reaches a quantity threshold, and the terminal device expects to activate a user plane connection of another session, the terminal device selects, for releasing, one or more sessions that each have an activated user plane connection, to reduce the quantity of sessions that each have the activated user plane connection. Because the session is released, session reestablishment is further needed when a user plane connection of the session is subsequently used again. Consequently, signaling is wasted, and a service establishment delay is increased.

SUMMARY

Embodiments of this application provide a session processing method and a communication apparatus, to avoid signaling waste and service establishment delay increasing that are caused by session reestablishment.

According to a first aspect, an embodiment of this application provides a session processing method. The method may be performed by a terminal device, or may be performed by a component (for example, a processor, a chip, or a chip system) of the terminal device. The session processing method may include: When a quantity of sessions of the terminal device that each have an activated user plane connection is not less than a quantity threshold, the terminal device determines to deactivate a user plane connection of at least one first session, where the sessions that each have the activated user plane connection include the at least one first session.

Optionally, when determining the to-be-deactivated user plane connection of the at least one first session in the sessions that each have the activated user plane connection, the terminal device may perform selection based on a session function. For example, if a session that has an activated user plane connection is used to send an abnormal data report, the terminal device cannot select the session to deactivate the user plane connection.

The terminal device sends a first request message to a first network element, where the first request message includes indication information, and the indication information indicates to deactivate the user plane connection of the at least one first session.

Correspondingly, a session management network element deactivates the user plane connection of the first session based on the indication information.

Through implementation of this embodiment of this application, when the quantity of sessions of the terminal device that each have the activated user plane connection is not less than the quantity threshold, the quantity of sessions of the terminal device that each have the activated user plane connection can be reduced by deactivating the user plane connection of the at least one first session. However, if the quantity of sessions of the terminal device that each have the activated user plane connection is reduced by deactivating a session, when a user plane connection of the session is used again to transmit data, the user plane connection needs to be activated, and the session also needs to be reestablished. Consequently, signaling is wasted, and a service establishment delay is increased. Therefore, in the manner of deactivating the user plane connection in this embodiment of this application, the signaling waste and the service establishment delay increasing that are caused by the session deactivation can be avoided.

In a possible design, that when a quantity of sessions of the terminal device that each have an activated user plane connection is not less than a quantity threshold, the terminal device determines to deactivate a user plane connection of at least one first session may include: When the terminal device is handed over from accessing a network over a non-narrow band internet of things to accessing the network over a narrow band internet of things, and the quantity of sessions of the terminal device that each have the activated user plane connection is greater than the quantity threshold, the terminal device determines to deactivate the user plane connection of the at least one first session.

Optionally, if the quantity of sessions of the terminal device that each have the activated user plane connection is greater than the quantity threshold, the terminal device may use, as the at least one to-be-deactivated first session, sessions whose quantity is the quantity of sessions of the terminal device that each have the activated user plane connection minus the quantity threshold, so that after the at least one first session is deactivated, a quantity of sessions of the terminal device that each have an activated user plane connection is equal to the quantity threshold. For example, if the quantity of sessions of the terminal device that each have the activated user plane connection is 5, and the quantity threshold is 2, the terminal device may use three sessions as the at least one first session, and deactivate user plane connections of the three first sessions.

It may be understood that, alternatively, after the terminal device deactivates the user plane connection of the at least one first session, a quantity of sessions of the terminal device that each have an activated user plane connection may be less than the quantity threshold. This is not limited in this embodiment of this application.

Through implementation of this embodiment of this application, in a scenario in which the terminal device is handed over from accessing the network over the non-narrow band internet of things to accessing the network over the narrow band internet of things, when the quantity of sessions of the terminal device that each have the activated user plane connection is greater than the quantity threshold, the user plane connection of the at least one first session may be deactivated, to reduce the quantity of sessions of the terminal device that each have the activated user plane connection.

In a possible design, that when a quantity of sessions of the terminal device that each have an activated user plane connection is not less than a quantity threshold, the terminal device determines to deactivate a user plane connection of at least one first session may include: When the quantity of sessions of the terminal device that each have the activated user plane connection is not less than the quantity threshold, for example, the quantity of sessions of the terminal device that each have the activated user plane connection is greater than or equal to the quantity threshold, and the terminal device determines to activate a user plane connection for at least one second session, determining, by the terminal device, to deactivate the user plane connection of the at least one first session, where the at least one second session has no activated user plane connection.

Optionally, if the second session is used to send the abnormal data report, the terminal device needs to deactivate the user plane connection of the first session, to activate the user plane connection for the second session.

In a possible design, when the terminal device is handed over from accessing the network over the non-narrow band internet of things to accessing the network over the narrow band internet of things, and the quantity of sessions of the terminal device that each have the activated user plane connection is greater than the quantity threshold, the terminal device may deactivate user plane connections of sessions whose quantity is the quantity of sessions of the terminal device that each have the activated user plane connection minus the quantity threshold and that are in the sessions that each have the activated user plane connection. For example, if the quantity of sessions of the terminal that each have the activated user plane connection is 5, and the quantity threshold is 2, the terminal device may choose to deactivate user plane connections of three first sessions. After the user plane connections of the three first sessions are deactivated, a quantity of sessions of the terminal device that each have an activated user plane connection is 2, that is, is equal to the quantity threshold. Then, the terminal device receives a request that is from an upper layer and that is used to request to activate the user plane connection for the at least one second session (for example, the upper layer may request to activate user plane connections for two second sessions). In this case, the terminal device further requests to deactivate the user plane connection of the at least one first session (for example, the terminal device may request to deactivate user plane connections of two first sessions, or may request to deactivate user plane connections of more than two first sessions), so that a quantity of sessions of the terminal device that each have an activated user plane connection is less than or equal to the quantity threshold after the user plane connection of the at least one first session is deactivated and the user plane connection of the at least one second session is activated.

In a possible design, an indication manner in which the indication information indicates to deactivate the user plane connection of the at least one first session includes but is not limited to: indicating to modify the at least one first session to a session using control plane optimization, indicating to modify the at least one first session to a session for which no user plane connection is established, or the like.

Through implementation of this embodiment of this application, the at least one first session may be modified to the session using control plane optimization, to deactivate the user plane connection of the at least one first session, and then reduce the quantity of sessions of the terminal device that each have the activated user plane connection.

In a possible design, the terminal device may send the first request message to a mobility management network element. The first request message may be a request message sent by the terminal device in a mobility management procedure. For example, the first request message may be a registration request message or a service request message.

Optionally, when the terminal device is handed over from accessing the network over the non-narrow band internet of things to accessing the network over the narrow band internet of things, and the quantity of sessions of the terminal device that each have the activated user plane connection is greater than the quantity threshold, the terminal device may send the registration request message, where the registration request message may include the indication information, and the indication information indicates to deactivate the user plane connection of the at least one first session.

Optionally, when the quantity of sessions of the terminal device that each have the activated user plane connection is greater than or equal to the quantity threshold, and the terminal device determines to activate the user plane connection for the at least one second session, the terminal device may send the service request message, where the service request message may include the indication information, and the indication information indicates to deactivate the user plane connection of the at least one first session.

It may be understood that the at least one first session may be managed by at least one session management network element, and the mobility management network element requests a corresponding session management network element to deactivate a user plane connection of a corresponding first session. For example, if the terminal device requests to deactivate a user plane connection of a session 1 and a user plane connection of a session 2, a session management network element 1 is configured to manage the session 1, and a session management network element 2 is configured to manage the session 2, the mobility management network element requests the session management network element 1 to deactivate the user plane connection of the session 1, and the mobility management network element requests the session management network element 2 to deactivate the user plane connection of the session 2.

Through implementation of this embodiment of this application, the first request message may be sent in the mobility management procedure, and deactivation of the user plane connection of the one or more first sessions may be requested. The one or more first sessions may relate to the at least one session management network element. To be specific, the mobility management procedure may be used to request to deactivate user plane connections of first sessions managed by a plurality of session management network elements, to improve efficiency of deactivating the user plane connections.

In a possible design, the terminal device may send the first request message to the session management network element. The first request message may be a request message sent by the terminal device in a session management procedure. For example, the first request message may be a session modification request message or a session establishment request message. It may be understood that the first request message may alternatively be another type of message in the session management procedure. This is not limited in this embodiment of this application.

Through implementation of this embodiment of this application, the terminal device requests the session management network element to deactivate the user plane connection of the at least one first session, to reduce a processing procedure of the mobility management network element, and reduce load of the mobility management network element.

In a possible design, the terminal device may access the network over the narrow band internet of things.

In a possible design, the at least one first session for which the user plane connection is to be deactivated does not include a session for sending an abnormal data report.

According to a second aspect, an embodiment of this application provides a session processing method. The method may be performed by a session management network element, or may be performed by a component (for example, a processor, a chip, or a chip system) of the session management network element. The session processing method may include: The session management network element receives a request message, where the request message may be a first request message sent by a terminal device or a second request message sent by a mobility management network element to the session management network element after the mobility management network element receives the first request message sent by the terminal device.

The request message includes indication information, and the indication information indicates the session management network element to deactivate a user plane connection of a first session. Optionally, the indication information may indicate to deactivate a user plane connection of one or more first sessions.

The first session belongs to sessions of the terminal device that each have an activated user plane connection, and a quantity of the sessions of the terminal device that each have the activated user plane connection is not less than a quantity threshold. For example, the terminal device is handed over from accessing a network over a non-narrow band internet of things to accessing the network over a narrow band internet of things, and the quantity of sessions of the terminal device that each have the activated user plane connection is greater than the quantity threshold. Alternatively, the quantity of sessions of the terminal device that each have the activated user plane connection is greater than or equal to the quantity threshold, and the terminal device determines to activate a user plane connection for at least one second session.

The session management network element deactivates the user plane connection of the corresponding first session based on the indication information.

Through implementation of this embodiment of this application, when the quantity of sessions of the terminal device that each have the activated user plane connection is not less than the quantity threshold, the quantity of sessions of the terminal device that each have the activated user plane connection can be reduced by deactivating the user plane connection of the at least one first session. However, if the quantity of sessions of the terminal device that each have the activated user plane connection is reduced by deactivating a session, when a user plane connection of the session is used again to transmit data, the user plane connection needs to be activated, and the session also needs to be reestablished. Consequently, signaling is wasted, and a service establishment delay is increased. Therefore, in the manner of deactivating the user plane connection in this embodiment of this application, the signaling waste and the service establishment delay increasing that are caused by the session deactivation can be avoided.

In a possible design, if the indication information indicates to modify the first session to a session using control plane optimization, the session management network element modifies, based on the indication information, the corresponding first session to the session using control plane optimization.

Through implementation of this embodiment of this application, the at least one first session may be modified to the session using control plane optimization, to deactivate the user plane connection of the at least one first session, and then reduce the quantity of sessions of the terminal device that each have the activated user plane connection.

In a possible design, the request message may be from the mobility management network element. To be specific, after receiving the first request message of the terminal device, the mobility management network element sends the second request message to the session management network element, where the second request message is the request message in this embodiment. The request message includes the indication information, the indication information indicates to deactivate the user plane connection of the first session, and the first session is managed by the session management network element.

Optionally, the request message may be a session context update message.

In a possible design, the request message may be from the terminal device, and the terminal device may send the request message to the session management network element in a session management procedure, where the request message may be of a request message type in the session management procedure.

Optionally, the request message may be a session establishment request message or a session modification request message.

In a possible design, before the session management network element deactivates the user plane connection of the first session based on the indication information, the method may further include: The session management network element determines, based on one or more of a local policy, a network configuration, or user subscription data, to deactivate the user plane connection of the first session.

Optionally, the session management network element may alternatively determine, based on one or more of a local policy, a network configuration, or user subscription data, that the user plane connection of the first session cannot be deactivated. For example, the first session is to be released by the session management network element, the first session cannot be modified to the session using the control plane optimization because control plane congestion occurs, a quantity of sessions using the control plane optimization reaches a maximum value, or a network does not support the control plane optimization, or the first session cannot be deactivated and the session management network element determines to deactivate a user plane connection of another session. For example, the terminal device requests to deactivate a user plane connection of a session 1, but the session management network element determines that the user plane connection of the session 1 cannot be deactivated, and deactivates a user plane connection of a session 2.

Through implementation of this embodiment of this application, the session management network element may determine, in a plurality of manners, whether the user plane connection of the first session can be deactivated, to satisfy requirements of a plurality of scenarios.

In a possible design, the session management network element sends a response message, where the response message includes user plane connection deactivation result information of the first session, and the user plane connection deactivation result information indicates successful or unsuccessful deactivation of the user plane connection of the first session. It may be understood that if the terminal device requests to deactivate user plane connections of a plurality of first sessions, the response message may include user plane connection deactivation result information of the plurality of first sessions.

Optionally, if the terminal device requests to deactivate the user plane connections of the plurality of first sessions, the session management network element may alternatively send response messages for a plurality of times. One response message indicates user plane connection deactivation result information of one first session.

For example, the session management network element may send the response message to the mobility management network element, and the mobility management network element sends the user plane connection deactivation result information of the first session to the terminal device. In this scenario, the response message may be a session context update response message.

For example, the session management network element may alternatively send the response message to the terminal device, where the response message includes the user plane connection deactivation result information. In this scenario, the response message may be a session modification response message, a session establishment response message, or the like.

In a possible design, if the user plane connection deactivation result information indicates the unsuccessful deactivation of the user plane connection of the first session, the response message further includes cause value information of the unsuccessful deactivation of the user plane connection.

In a possible design, the cause value information includes one or more of the following information: control plane congestion occurs, a quantity of sessions using the control plane optimization reaches a maximum value, a network does not support the control plane optimization, deactivation of the user plane connection is not allowed, the session is to be released, or a user plane connection of another session is deactivated.

Through implementation of this embodiment of this application, the terminal device can learn of a cause of the unsuccessful deactivation of the user plane connection.

According to a third aspect, an embodiment of this application provides a communication apparatus, including units or modules configured to perform the method according to the first aspect or the second aspect.

According to a fourth aspect, an embodiment of this application provides a communication apparatus, including a processor. The processor is coupled to a memory, and may be configured to execute instructions in the memory, to implement the method according to the first aspect or the second aspect. Optionally, the communication apparatus further includes the memory. Optionally, the communication apparatus further includes a communication interface. The processor is coupled to the communication interface.

According to a fifth aspect, an embodiment of this application provides a processor, including an input circuit, an output circuit, and a processing circuit. The processing circuit is configured to receive a signal by using the input circuit, and transmit a signal by using the output circuit, so that the processor performs the method according to the first aspect or the second aspect.

In a specific implementation process, the processor may be one or more chips, the input circuit may be an input pin, the output circuit may be an output pin, and the processing circuit may be a transistor, a gate circuit, a trigger, various logic circuits, and the like. The input signal received by using the input circuit may be received and input by using, for example, but not limited to, a receiver, the signal output by using the output circuit may be output to, for example, but not limited to, a transmitter and transmitted by using the transmitter, and the input circuit and the output circuit may be a same circuit, where the circuit is used as the input circuit and the output circuit at different moments. Specific implementations of the processor and the various circuits are not limited in this embodiment of this application.

According to a sixth aspect, an embodiment of this application provides a processing apparatus, including a processor and a memory. The processor is configured to: read instructions stored in the memory, receive a signal by using a receiver, and transmit a signal by using a transmitter, to perform the method according to the first aspect or the second aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that a related data exchange process, for example, sending a request message, may be a process of outputting the request message from the processor, and for example, receiving a message, may be a process of receiving the message by the processor. Specifically, data output by the processor may be output to the transmitter, and input data received by the processor may be from the receiver. The transmitter and the receiver may be collectively referred to as a transceiver.

The processing apparatus in the sixth aspect may be one or more chips. The processor in the processing apparatus may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. The memory may be integrated into the processor, or may be located outside the processor and exist independently.

According to a seventh aspect, an embodiment of this application provides a computer program product. The computer program product includes a computer program (which may also be referred to as code or instructions). When the computer program is run, a computer is enabled to perform the method according to the first aspect or the second aspect.

According to an eighth aspect, an embodiment of this application provides a computer-readable storage medium. The computer-readable storage medium stores a computer program (which may also be referred to as code or instructions). When the computer program is run on a computer, the computer is enabled to perform the method according to the first aspect or the second aspect.

According to a ninth aspect, an embodiment of this application provides a communication system, including the foregoing terminal device and session management network element.

Optionally, the communication system may further include a mobility management network element.

According to a tenth aspect, a chip system is provided. The chip system includes a processor and an interface. The processor is configured to invoke, from a memory, a computer program (which may also be referred to as code or instructions) stored in the memory and run the computer program, to implement a function in the first aspect or the second aspect. In a possible design, the chip system further includes the memory, and the memory is configured to store necessary program instructions and data. The chip system may include a chip, or may include the chip and another discrete component.

DETAILED DESCRIPTION OF ILLUSTRATIVE EMBODIMENTS

Technical solutions in embodiments of this application may be applied to various communication systems, for example, a long term evolution (LTE) system, a universal mobile telecommunication system (UMTS), a 5th generation (5G) system, a new radio (NR) system, and another new system emerging with development of technologies.

Figure 1:
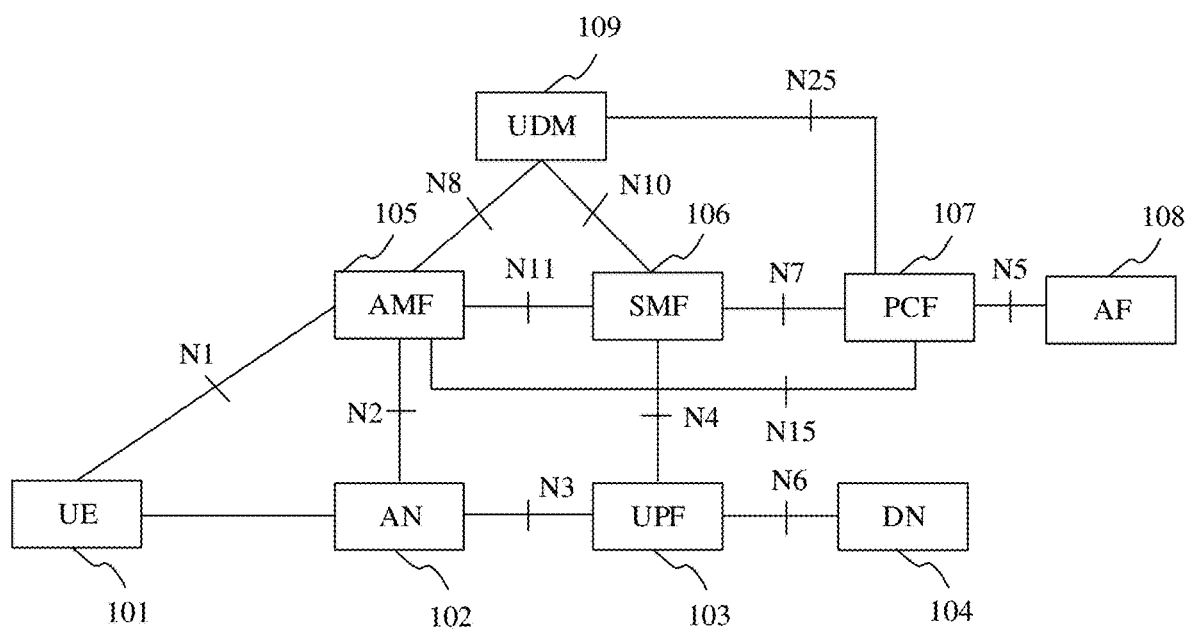
FIG. 1 is a diagram of an architecture of a 5G system according to an embodiment of this application.

FIG. 1 is a schematic diagram of a 5G system that may be used in this application. As shown in FIG. 1, the system may be divided into two parts: an access network and a core network. The access network is used to implement a function related to radio access, and mainly includes an access network (AN) device 102. The access network device includes a radio access network (RAN) device and another device (for example, Wi-Fi) for access through an air interface. The core network mainly includes the following several key logical network elements: a user plane function 103, an access and mobility management function (AMF) 105, a session management function 106, a policy control function (PCF) 107, and a unified data management function 109. The system wo may further include user equipment (UE) 101, a data network (DN) 104, and an application function (AF) 108. Interfaces between the network elements are shown in FIG. 1. It should be understood that the network elements may alternatively communicate with each other through a service-oriented interface.

The UE may also be referred to as a terminal device. The terminal device may communicate with one or more core networks (CN) by using the AN device. The terminal device may be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in an internet of things, a terminal device in an internet of vehicles, a terminal device in any form in a future network, or the like.

The AN device is a device that connects the terminal device to a wireless network, and may be specifically a base station. There may be various forms of base stations, for example, a macro base station, a micro base station (which is also referred to as a small cell), a relay station, and an access point. The base station may be specifically an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in the 5G system, a base station in a future evolved public land mobile network (PLMN), or the like.

The UDM has functions such as managing subscription data of a user and generating authentication information of the user.

The AMF is mainly responsible for functions such as registration management of the UE, connection management of the UE, reachability management of the UE, access authorization and access authentication of the UE, a security function of the UE, mobility management of the UE, network slice selection, and SMF selection. The AMF serves as an anchor of an N1/N2 signaling connection, provides the SMF with routing of an N1/N2 session management (SM) message, and maintains and manages state information of the UE. The AMF is a mobility management network element in the 5G system.

The SMF is mainly responsible for all control plane functions in session management of the UE. The control plane functions include UPF selection and control, internet protocol (IP) address assignment and management, quality of service (QoS) management of a session, and obtaining of a policy and charging control (PCC) policy from the PCF. The SMF also serves as a termination of an SM part in a non-access stratum (NAS) message.

The PCF has a function, for example, providing a policy rule for a control plane functional entity.

The AF may be an application server that may belong to an operator or a third party.

The UPF is mainly responsible for processing a user packet, for example, forwarding and charging. The UPF may serve as an anchor of a protocol data unit (PDU) session connection, namely, a PDU session anchor (PSA), and is responsible for data packet filtering, data transmission/forwarding, rate control, charging information generation, user plane QoS processing, uplink transmission authentication, transmission class verification, downlink data packet buffering, downlink data notification triggering, and the like of the UE. The UPF may also serve as a branching point of a multi-homed PDU session.

The DN is a network that provides the user with a data transmission service, for example, an IP multimedia service (IMS) or the Internet. The DN may include the application server (AS). The AS is a software framework, provides an environment in which an application program is run, and is configured to provide the application program with services such as security, data, transaction support, load balancing, and large-scale distributed system management. The UE communicates with the AS to obtain an application packet. It should be noted that the AF is a control plane of the AS.

It should be understood that embodiments of this application are not limited to being applied to the system architecture shown in FIG. 1. For example, a communication system to which a session management method in embodiments of this application may be applied may include more or fewer network elements or devices. The devices or the network elements in FIG. 1 may be hardware, or may be software obtained through function division or a combination of the hardware and the software. The devices or the network elements in FIG. 1 may communicate with each other by using another device or network element.

Before the method in this application is described in detail, some concepts in this application are first briefly described.

A user plane connection (UP connection) in embodiments of this application may be referred to as user-plane resources, radio bearer resources, data radio resources, a data radio bearer, or the like, and refers to resource established between a terminal device and a UPF. Optionally, the user plane connection may include the DRB and/or an N3 tunnel. The DRB may be a data radio bearer between an access network device and the terminal device, and the N3 tunnel may be a data transmission tunnel established between the access network device and the user plane function network element. The user plane connection may be used to transmit data.

In embodiments of this application, a session that has an activated user plane connection may be understood as that the user plane connection is established for the session. Activating a user plane connection for the session may be understood as establishing the user plane connection for the session.

Deactivating a user plane connection of the session in embodiments of this application may be referred to as releasing the user plane connection of the session, where deactivating the user plane connection of the session may be understood as releasing a resource of the user plane connection of the session.

The session in embodiments of this application may be a PDU session, or may be another session. This is not limited in embodiments of this application.

A session using control plane optimization in embodiments of this application may be a PDU session established for control plane CIoT optimization (for example, a PDU session(s) established for control plane CIoT Optimization), a PDU session using the control plane CIoT optimization (for example, use Control Plane CIoT Optimization for the PDU session(s) or a PDU session(s) using Control Plane CIoT Optimization), or a session for transmitting data by using a control plane. No user plane connection is established for the session using control plane optimization. That is, no user-plane resource is used for data transmission performed by using the session using control plane optimization.

A narrow band internet of things NB-IoT is of a radio access technology (RAT) type. The NB-IoT allows access to a network through evolved UTRA (E-UTRA) with a channel bandwidth less than 200 kHz.

An abnormal data report in embodiments of this application is an abnormal event report sent by UE that uses a cellular internet of things (CIoT) feature, and may also be referred to as an abnormal report.

Using user plane CIoT optimization in embodiments of this application means that when UE enters an idle state, a radio resource control (RRC) connection may be suspended, and the UE and a RAN store information such as an access stratum (AS) context, and no AS context needs to be established when the UE enters a connected state from the idle state.

UE in the connected state has a non-access stratum (NAS) signaling connection to an AMF, where the NAS signaling connection is established by using an N1 interface. UE in the idle state has no NAS signaling connection to the AMF, where the NAS signaling connection is established by using the N1 interface. The UE in the idle state has no AN signaling connection, N2 connection, or N3 connection.

Optionally, when a quantity of sessions of a terminal device that each have an activated user plane connection is not less than a quantity threshold, the terminal device may send a first request message to a mobility management network element, where the first request message includes indication information, and the indication information indicates to deactivate a user plane connection of at least one first session. The mobility management network element determines at least one session management network element configured to manage the at least one first session, and sends a second request message (which may also be referred to as a request message) to the corresponding session management network element, where the second request message includes the indication information, and the indication information indicates to deactivate the user plane connection of the first session. Correspondingly, the session management network element deactivates the user plane connection of the first session based on the indication information. For details, refer to descriptions in a subsequent embodiment in FIG. 2. The details are not described herein.

Optionally, when a quantity of sessions of a terminal device that each have an activated user plane connection is not less than a quantity threshold, the terminal device may send a first request message to a session management network element, where the first request message includes indication information, and the indication information indicates to deactivate a user plane connection of at least one first session. Correspondingly, the session management network element receives the first request message (which may also be referred to as a request message), and deactivates the user plane connection of the first session based on the indication information. For details, refer to descriptions in a subsequent embodiment in FIG. 3. The details are not described herein.

Figure 2:
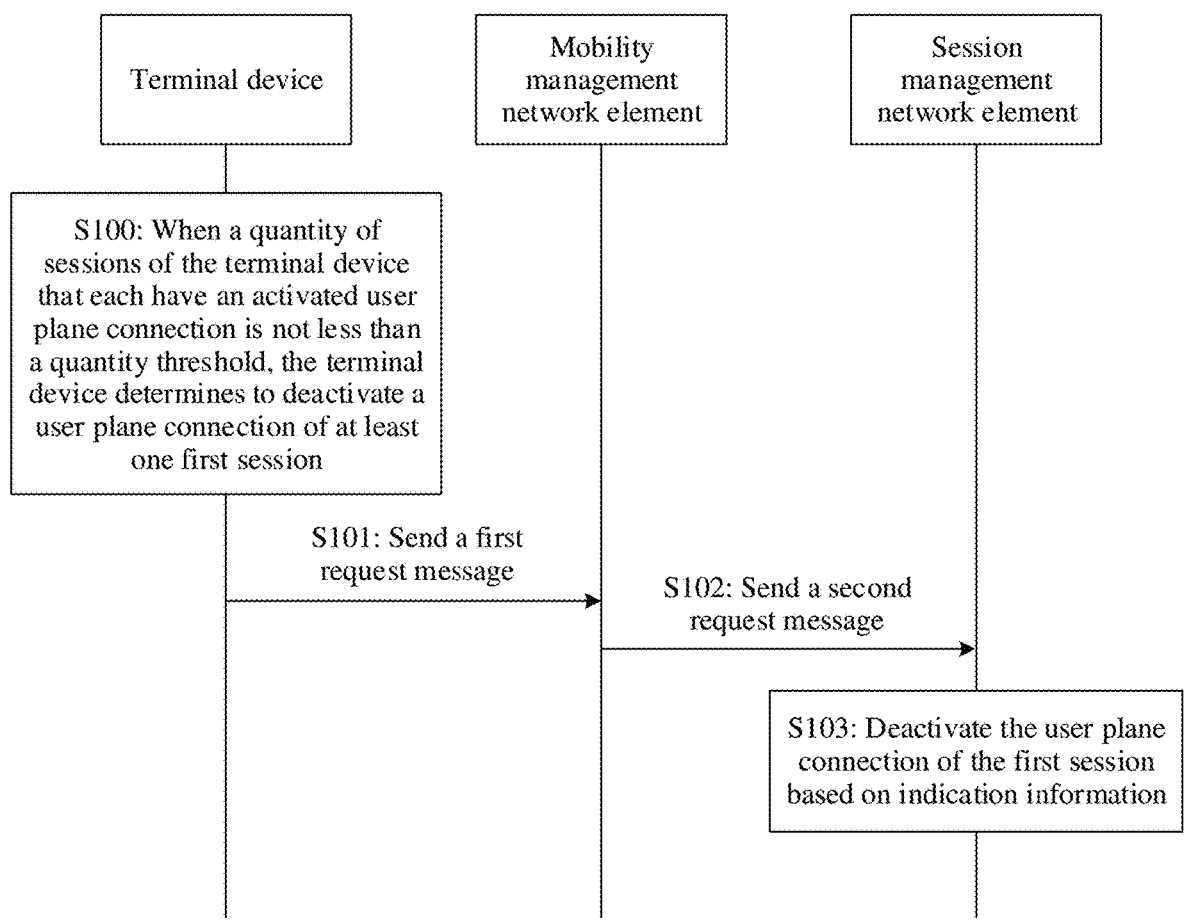
FIG. 2 is a schematic flowchart of a session processing method according to an embodiment of this application.
Figure 3:
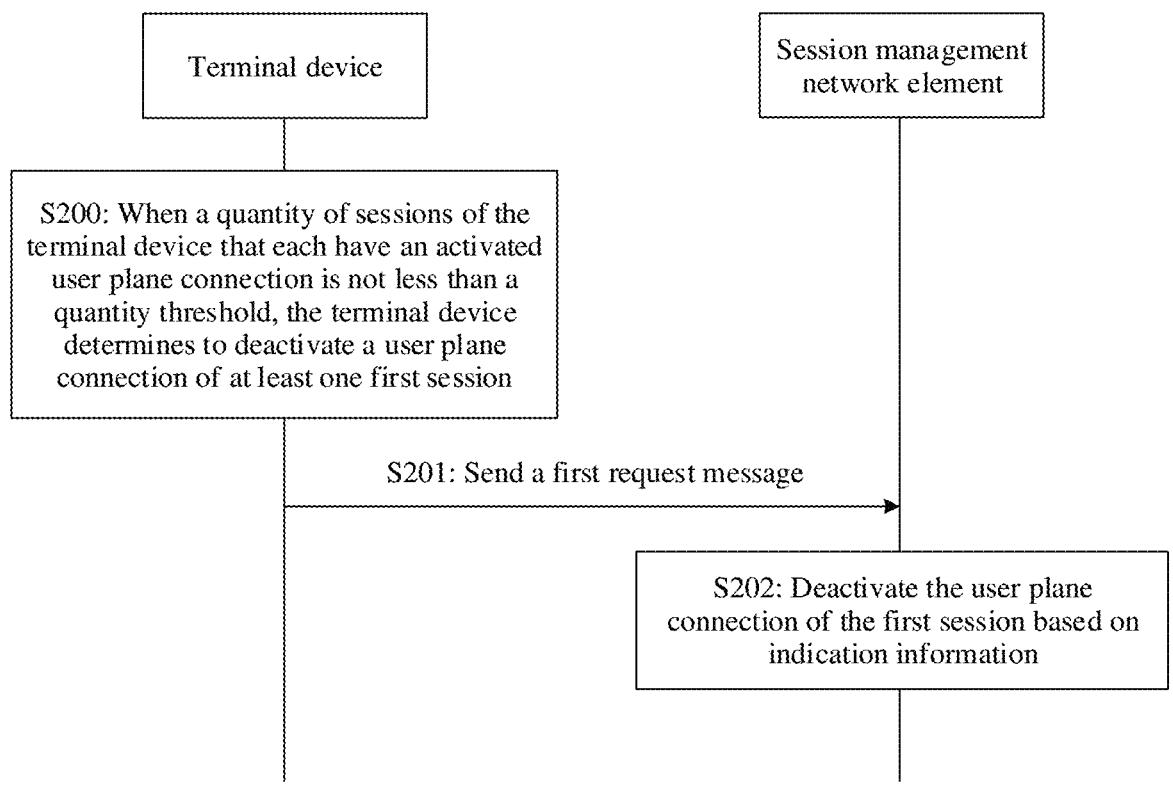
FIG. 3 is a schematic flowchart of another session processing method according to an embodiment of this application.

The following separately describes the session processing method in embodiments of this application with reference to FIG. 2 and FIG. 3. In FIG. 2, a terminal device may send a first request message to a mobility management network element, to indicate to deactivate a user plane connection of at least one first session. For example, the terminal device requests, by using a mobility management procedure, to deactivate the user plane connection of the at least one first session. In FIG. 3, a terminal device may send a first request message to a session management network element, to indicate to deactivate a user plane connection of at least one first session. For example, the terminal device requests, by using a session management procedure, to deactivate the user plane connection of the at least one first session.

FIG. 2 is a schematic flowchart of a session processing method according to an embodiment of this application. In this embodiment of this application, a first network element may be a mobility management network element. As shown in the figure, the session processing method in this embodiment of this application includes but is not limited to the following steps.

S100: When a quantity of sessions of a terminal device that each have an activated user plane connection is not less than a quantity threshold, the terminal device determines to deactivate a user plane connection of at least one first session, where the sessions that each have the activated user plane connection include the at least one first session.

In an embodiment, the terminal device may access a network over a narrow band internet of things NB-IoT. That the quantity of sessions that each have the activated user plane connection is not less than the quantity threshold may be that the quantity of sessions that each have the activated user plane connection is greater than or equal to the quantity threshold. The quantity threshold may be a maximum quantity, defined in a protocol, of sessions allowed to have activated user plane connections when the terminal device accesses the network over the narrow band internet of things, and may be, for example, 2 or 3. The at least one first session for which the user plane connection needs to be deactivated has an activated user plane connection.

In a first optional implementation, when the quantity of sessions of the terminal device that each have the activated user plane connection has reached a maximum value (for example, may be greater than or equal to a quantity threshold), an upper layer of the terminal device requests to activate a user plane connection for at least one second session. The at least one second session has no activated user plane connection. In this case, the terminal device determines to deactivate the user plane connection of the at least one first session. Optionally, the terminal device may determine, based on the quantity of sessions that each have the activated user plane connection, a quantity of the at least one second session, and the quantity threshold, a quantity of the at least one first session for which the user plane connection is to be deactivated, so that a quantity of sessions of the terminal device that each have an activated user plane connection is less than or equal to the quantity threshold after the user plane connection of the at least one second session is activated and the user plane connection of the at least one first session is deactivated.

For example, if the quantity of sessions of the terminal device that each have the activated user plane connection is 3, the quantity threshold is 3, and user plane connections of two second sessions are to be activated, user plane connections of two first sessions may be deactivated, so that a quantity of sessions of the terminal device that each have an activated user plane connection is 3, that is, is equal to the quantity threshold 3 after the user plane connection of the at least one second session is activated and the user plane connection of the at least one first session is deactivated. Alternatively, user plane connections of three first sessions may be deactivated, so that a quantity of sessions of the terminal device that each have an activated user plane connection is 2, that is, is less than the quantity threshold 3 after the user plane connection of the at least one second session is activated and the user plane connection of the at least one first session is deactivated. This is not limited in this embodiment of this application.

In a second optional implementation, when the terminal device is handed over from accessing the network over a non-narrow band internet of things to accessing the network over the narrow band internet of things, and the quantity of sessions of the terminal device that each have the activated user plane connection is greater than the quantity threshold, the terminal device may choose to deactivate the user plane connection of the at least one first session, so that a quantity of sessions of the terminal device that each have an activated user plane connection is less than or equal to the quantity threshold. Optionally, the terminal device may determine, based on the quantity of sessions that each have the activated user plane connection and the quantity threshold, a quantity of the at least one first session for which the user plane connection is to be deactivated, so that a quantity of sessions of the terminal device that each have an activated user plane connection is less than or equal to the quantity threshold after the user plane connection of the at least one first session is deactivated.

For example, if the quantity of sessions of the terminal device that each have the activated user plane connection is 3, and the quantity threshold is 2, a user plane connection of one first session is deactivated, so that a quantity of sessions of the terminal device that each have an activated user plane connection is 2, that is, is equal to the quantity threshold after the user plane connection of the at least one first session is deactivated. Alternatively, user plane connections of two first sessions may be deactivated, so that a quantity of sessions of the terminal device that each have an activated user plane connection is 1, that is, is less than the quantity threshold 2 after the user plane connection of the at least one first session is deactivated. This is not limited in this embodiment of this application.

In some possible scenarios, the to-be-deactivated user plane connection of the at least one first session may be determined with reference to the first optional implementation and the second optional implementation. For example, when the terminal device is handed over from accessing the network over the non-narrow band internet of things to accessing the network over the narrow band internet of things, and the quantity of sessions of the terminal device that each have the activated user plane connection is greater than the quantity threshold, the terminal device may deactivate user plane connections of sessions whose quantity is the quantity of sessions of the terminal device that each have the activated user plane connection minus the quantity threshold and that are in the sessions that each have the activated user plane connection. For example, if the quantity of sessions of the terminal that each have the activated user plane connection is 5, and the quantity threshold is 2, the terminal device may choose to deactivate user plane connections of three first sessions. After the user plane connections of the three first sessions are deactivated, a quantity of sessions of the terminal device that each have an activated user plane connection is 2, that is, is equal to the quantity threshold. Then, the terminal device receives the request that is from the upper layer and that is used to request to activate the user plane connection for the at least one second session (for example, the upper layer may request to activate user plane connections for two second sessions). In this case, the terminal device further requests to deactivate the user plane connection of the at least one first session (for example, the terminal device may request to deactivate user plane connections of two first sessions), so that the quantity of sessions of the terminal device that each have the activated user plane connection is less than or equal to the quantity threshold after the user plane connection of the at least one first session is deactivated and the user plane connection of the at least one second session is activated.

Optionally, when determining the at least one to-be-deactivated first session in the sessions that each have the activated user plane connection, the terminal device may perform selection based on a session function. For example, if a session that has an activated user plane connection is used to send an abnormal data report, the terminal device cannot select the session to deactivate the user plane connection.

Optionally, if a second session for which a user plane connection is to be established (or activated) is used to send an abnormal data report, the terminal device needs to choose to deactivate the user plane connection of the one or more first sessions.

For example, in some possible scenarios, for example, when the terminal device is handed over from accessing the network over the non-narrow band internet of things to accessing the network over the narrow band internet of things, a session management network element may determine, based on one or more of a local policy, a network configuration, or user subscription data, to release one or more sessions, send a release instruction to the terminal device, where the release instruction instructs whether to reestablish the released session. In this embodiment of this application, the sessions of the terminal device that each have the activated user plane connection may include a session that the session management network element determines to release and reestablish and a session reserved by the session management network element, and the session that the session management network element determines to release and reestablish and the session reserved by the session management network element each may have an activated user plane connection. The session reserved by the session management network element is a session that the session management network element determines not to release. It may be understood that, in this scenario, the at least one first session subsequently requested to be deactivated may be the session that the session management network element determines to release and reestablish and/or the session reserved by the session management network element.

S101: The terminal device sends a first request message to the mobility management network element, where the first request message includes indication information, and the indication information indicates to deactivate the user plane connection of the at least one first session.

In a possible design, the indication information may be information about a list of session user plane connections to be deactivated. The information about a list of session user plane connections to be deactivated includes a session identity (ID) list. The session ID list includes a session ID of the at least one first session. The session ID list is used to indicate that a user plane connection of a corresponding session is to be deactivated. The information about a list of session user plane connections to be deactivated may be a newly added value in an existing information element, or may be a newly added information element.

In another possible design, the indication information may be bit information. If a user plane connection of one first session needs to be deactivated, the indication information includes one bit. If user plane connections of a plurality of first sessions need to be deactivated, the indication information may include a plurality of bits, where a bit set or a bit list may include the plurality of bits. One bit corresponds to one first session.

Optionally, a bit 0 may indicate not to deactivate a user plane connection of a corresponding first session, and a bit 1 may indicate to deactivate a user plane connection of a corresponding first session. Certainly, alternatively, a bit 0 may indicate to deactivate a user plane connection of a corresponding first session, and a bit 1 may indicate not to deactivate a user plane connection of a corresponding first session. This is not limited in this embodiment of this application.

The following uses an example in which the bit 0 indicates not to deactivate the user plane connection of the corresponding first session, and the bit 1 indicates to deactivate the user plane connection of the corresponding first session. For example, in a 5G system, the terminal device may have a maximum of 15 sessions. As shown in Table 1, PDU session ID (PSI)(1) corresponds to a session whose session ID is 1, PSI(2) corresponds to a session whose session ID is 2, and so on. If the quantity of sessions of the terminal device that each have the activated user plane connection is 3, the quantity threshold is 2, and UE requests to deactivate a user plane connection of one first session, for example, to deactivate the session whose session ID is 1, a bit of PSI(1) in Table 1 is set to 1. Optionally, remaining bits are set to 0. For example, the bit 0 may be a default value. In this case, the bit of PSI(1) may only need to be set to 1. If the quantity of sessions of the terminal device that each have the activated user plane connection is 5, the quantity threshold is 3, and UE requests to deactivate user plane connections of two first sessions, for example, to deactivate the session whose session ID is 1 and the session whose ID is 2, a bit of PSI(1) and a bit of PSI(2) in Table 1 are set to 1. Optionally, remaining bits are set to 0. For example, the bit 0 may be a default value. In this case, the bit of PSI(1) and the bit of PSI(2) may only need to be set to 1.

TABLE 1

| PSI(7) | PSI(6) | PSI(5) | PSI(4) | PSI(3) | PSI(2) | PSI(1) | PSI(0) |
|---|---|---|---|---|---|---|---|
| PSI(15) | PSI(14) | PSI(13) | PSI(12) | PSI(11) | PSI(10) | PSI(9) | PSI(8) |

The first request message may be a request message sent by the terminal device in a mobility management procedure. The mobility management procedure includes but is not limited to a service request procedure and a registration update procedure, which are separately described below by using examples.

For example, the first request message may be a service request message in the service request procedure. For example, when the quantity of sessions of the terminal device that each have the activated user plane connection has reached the maximum value (that is, the quantity of sessions that each have the activated user plane connection is greater than or equal to the quantity threshold), the upper layer of the terminal device requests to activate the user plane connection for the at least one second session, and the terminal device may choose to deactivate the user plane connection of the one or more first sessions. In this case, the terminal device initiates the service request procedure, that is, sends the service request message to the mobility management network element, where the service request message includes a user plane connection deactivation indication (namely, the indication information), and the user plane connection deactivation indication indicates to deactivate the user plane connection of the one or more first sessions. It may be understood that the user plane connection deactivation indication may be a new function in an existing information element (IE) in the service request message, or may be a newly added IE in the service request message. This is not limited in this application.

For example, the first request message may be a registration request message in the registration update procedure, and the registration update procedure is also referred to as a mobility registration update procedure. For example, when being handed over from accessing the network over the non-narrow band internet of things to accessing the network over the narrow band internet of things, the terminal device may initiate the registration update procedure. If the quantity of sessions of the terminal device that each have the activated user plane connection exceeds the quantity threshold, the terminal device may choose to deactivate the user plane connection of the one or more first sessions, so that the quantity of sessions of the terminal device that each have the activated user plane connection is less than or equal to the quantity threshold. In the registration update procedure, the terminal device sends a registration request message to the mobility management network element, where the registration request message may include a user plane connection deactivation indication (namely, the indication information), and the user plane connection deactivation indication indicates to deactivate the user plane connection of the one or more first sessions.

Optionally, an indication manner in which the indication information indicates to deactivate the user plane connection of the at least one first session includes but is not limited to indicating to modify or reestablish the at least one first session to a session using control plane optimization, indicating to modify or reestablish the at least one first session to a session for which no user plane connection is established, or the like. This is not limited in this embodiment of this application. Modifying or reestablishing the at least one first session to the session using the control plane optimization may be modifying or reestablishing the at least one first session to a session using control plane CIoT optimization and not using N3 data transmission. In this implementation, the sessions of the terminal device that each have the activated user plane connection may include but are not limited to the following sessions: a session using the control plane CIoT optimization and using the N3 data transmission, a session using user plane CIoT optimization, or a session not using CIoT optimization.

It should be understood that not using the N3 data transmission means that no user plane connection is established for a corresponding session, and data corresponding to the corresponding session is transmitted by using a control plane.

S102: The mobility management network element sends a second request message to the session management network element, where the second request message includes the indication information, and the indication information indicates to deactivate the user plane connection of the first session.

In an embodiment, the terminal device sends the first request message to the mobility management network element. Correspondingly, the mobility management network element receives the first request message, and parses the first request message, to obtain the session ID of the at least one first session for which the terminal device needs to deactivate the user plane connection. Further, the mobility management network element determines at least one session management network element configured to manage the at least one first session, and sends the second request message to the corresponding session management network element.

For example, the at least one first session for which the terminal device needs to deactivate the user plane connection is a session 1, a session 2, a session 3, and a session 4. A session management network element 1 is configured to manage the session 1 and the session 2, and a session management network element 2 is configured to manage the session 3 and the session 4. In this case, the mobility management network element sends, to the session management network element 1, a second request message for requesting to deactivate a user plane connection of the session 1 and a user plane connection of the session 2, and the mobility management network element sends, to the session management network element 2, a second request message for requesting to deactivate a user plane connection of the session 3 and a user plane connection of the session 4. It may be understood that the mobility management network element may request to deactivate a user plane connection of one or more first sessions each time. If the mobility management network element requests to deactivate a user plane connection of one first session each time, the mobility management network element may request to deactivate user plane connections of a plurality of first sessions for a plurality of times. For example, the mobility management network element may separately request the session management network element 2 twice to deactivate the user plane connection of the session 3 and the user plane connection of the session 4.

The second request message includes the indication information, and the indication information indicates to deactivate the user plane connection of the first session. Optionally, one second request message may correspond to one first session. For example, the second request message may include a session ID of the first session. Indication information in the second request message may be one-bit information, and the bit information is used to indicate whether to deactivate a user plane connection of the first session.

Optionally, the bit 0 may indicate not to deactivate the user plane connection of the first session, and the bit 1 may indicate to deactivate the user plane connection of the first session. Certainly, alternatively, the bit 0 may indicate to deactivate the user plane connection of the first session, and the bit 1 may indicate not to deactivate the user plane connection of the first session. This is not limited in this embodiment of this application. Herein, that the bit 0 indicates not to deactivate the user plane connection of the first session, and the bit 1 indicates to deactivate the user plane connection of the first session is used as an example. For example, the bit 0 may be the default value. If the user plane connection of the first session needs to be deactivated, the bit only needs to be set to 1.

Further optionally, the second request message may further include cause value information of user plane connection deactivation. The cause value information includes but is not limited to the following: 1. The quantity of sessions of the terminal device that each have the activated user plane connections has reached the maximum value (where the quantity of sessions that each have the activated user plane connections is greater than or equal to the quantity threshold), and the upper layer of the terminal device requests to activate the user plane connection for the at least one second session. 2. When the terminal device is handed over from accessing the network over the non-narrow band internet of things to accessing the network over the narrow band internet of things, the quantity of sessions of the terminal device that each have the activated user plane connection is greater than the quantity threshold. 3. Another possible cause of that the terminal device expects to deactivate the user plane connection.

Optionally, the second request message may be a session context update message (or may also be referred to as a session context update service operation request message), or certainly may be another type of message. This is not limited in this application. If the second message is the session context update message, the mobility management network element may invoke a session context update (for example, UpdateSMContext) service operation of a service-oriented interface (for example, Nsmf_PDUSession) of the session management network element, to send the session context update message. The session context update message includes the session ID of the at least one first session for which the user plane connection needs to be deactivated.

For example, if the indication information in the first request message indicates to modify or reestablish the at least one first session to the session using the control plane optimization, before sending the second request message, the mobility management network element may further determine whether the at least one first session can be modified or reestablished to the session using the control plane optimization. If the mobility management network element determines that the at least one first session can be modified or reestablished to the session using the control plane optimization, the mobility management network element sends the second request message to the session management network element, and indicates to modify or reestablish the first session to the session using the control plane optimization.

If the mobility management network element determines that the at least one first session cannot be modified or reestablished to the session using the control plane optimization (optionally, the mobility management network element may determine that a part of a plurality of first sessions requested by the terminal device cannot be modified or reestablished to the session using the control plane optimization), the mobility management network element returns information sent by the terminal device to the terminal device through a downlink NAS transport message, and carries cause value information of forwarding disabled. The cause value information includes but is not limited to the following: 1. Control plane congestion occurs. 2. A quantity of sessions using the control plane optimization has reached a maximum value. 3. A network side does not support using of the control plane optimization. 4. Another possible cause. In this case, step S102 and step S103 are not performed.

S103: The session management network element deactivates the user plane connection of the first session based on the indication information.

In some possible scenarios, before deactivating the user plane connection of the first session, the session management network element may further determine, based on one or more of the local policy, the network configuration, or the user subscription data, whether the user plane connection of the requested first session can be deactivated. If the user plane connection of the first session can be deactivated, the session management network element deactivates the user plane connection of the first session based on the indication information. That is, the user plane connection of the first session is successfully deactivated. If the user plane connection of the first session cannot be deactivated, the session management network element does not deactivate the user plane connection of the first session. That is, the user plane connection of the first session is unsuccessfully deactivated. For specific cause value information, refer to descriptions in subsequent embodiments. Details are not described herein. It may be understood that, that the user plane connection is unsuccessfully deactivated in this application may also mean that the session management network element fails in a user plane connection deactivation process, and consequently the user plane connection of the first session is unsuccessfully deactivated.

That the session management network element deactivates the user plane connection of the first session may mean that the session management network element interacts with a user plane function network element (where the user plane function network element is associated with the first session), to release an N3 tunnel resource of the first session. For details, refer to descriptions in subsequent embodiments. Details are not described herein.

Further, optionally, the session management network element may further send a response message to the mobility management network element, where the response message includes user plane connection deactivation result information of the first session. The user plane connection deactivation result information indicates successful or unsuccessful deactivation of the user plane connection of the first session. If the user plane connection deactivation result information indicates the unsuccessful deactivation of the user plane connection of the first session, the response message may further include cause value information of the unsuccessful deactivation of the user plane connection. The cause value information includes one or more of the following information: The first session is to be released, the control plane congestion occurs, the quantity of sessions using the control plane optimization reaches the maximum value, a network does not support the control plane optimization, deactivation of the user plane connection is not allowed, a user plane connection of another session is deactivated, or the like. This is not limited in this embodiment of this application. The following describes each piece of cause value information by using an example.

1. The first session is to be released. For example, when the terminal device is handed over from accessing the network over the non-narrow band internet of things to accessing the network over the narrow band internet of things, that is, when the first request message is the registration request message in the mobility management procedure, the session management network element determines, after receiving the second request message, whether the first session for which the user plane connection is requested to be deactivated is to be released by the session management network element. If the first session is to be released by the session management network element, the session management network element may refuse to deactivate the user plane connection of the first session, and return refuse cause value information, where the refuse cause value information includes but is not limited to the following: 1. The first session is to be released. 2. The first session is to be released and reestablished. 3. Another possible cause. The refuse cause value information may be sent to the mobility management network element via the response message. For details, refer to the descriptions in the foregoing embodiment. The details are not described herein again.

It may be understood that when the session management network element releases the first session, the user plane connection of the first session is deactivated, and the session management network element may not deactivate the user plane connection of the first session for the indication information. Therefore, it may be considered that the session management network element refuses to deactivate the user plane connection of the first session, and returns the refuse cause value information.

2. The control plane congestion occurs, the quantity of sessions using the control plane optimization reaches the maximum value, or the network does not support the control plane optimization. For another example, if the indication information indicates to modify or reestablish the first session to the session using the control plane optimization, the session management network element may determine, based on one or more of the local policy, the network configuration, or the user subscription data, whether the first session can be modified to the session using the control plane optimization. If the first session can be modified to the session using the control plane optimization, the first session is modified, based on the indication information, to the session using the control plane optimization, so that a quantity of sessions of the terminal device that each have an activated user plane connection is less than or equal to the quantity threshold. If the first session cannot be modified to the session using the control plane optimization, the unsuccessful deactivation of the user plane connection is returned. Optionally, cause value information of control plane optimization using disabled may be further carried. The cause value information of control plane optimization using disabled includes but is not limited to the following: 1. The control plane congestion occurs. 2. The quantity of sessions using the control plane optimization has reached the maximum value. 3. The network side does not support the control plane optimization. 4. Another possible cause. The cause value information of control plane optimization using disabled may be sent to the mobility management network element via the response message. For details, refer to the descriptions in the foregoing embodiment. The details are not described herein again.

3. The deactivation of the user plane connection is not allowed, or the user plane connection of the another session is deactivated. For another example, the session management network element may alternatively choose, based on one or more of the local policy, the network configuration, or the user subscription data, to deactivate the user plane connection of the another session (not the at least one first session indicated by the mobility management network element). For example, the indication information indicates to deactivate a user plane connection of a session 1 and a user plane connection of a session 3, and the session management network element may determine, based on one or more of the local policy, the network configuration, or the user subscription data, that the user plane connection of the session 3 cannot be deactivated and a user plane connection of a session 4 may be deactivated. Therefore, the session management network element may deactivate the user plane connection of the session 1 and the user plane connection of the session 4, and return unsuccessful deactivation of the user plane connection of the session 3 and cause value information of the unsuccessful deactivation of the user plane connection, where the cause value information of the unsuccessful deactivation of the user plane connection may be that the user plane connection of the another session is deactivated, that the deactivation of the user plane connection of the session is not allowed, or another possible cause. The cause value information may be sent to the mobility management network element via the response message. For details, refer to the descriptions in the foregoing embodiment. The details are not described herein again.

For example, the response message in this embodiment may be a session context update response message. If the user plane connection deactivation result information in the response message indicates the successful deactivation of the user plane connection of the first session, the response message may further include N2 session management (SM) information (where the N2 SM information is session-related information sent by the session management network element to an access network device). The N2 SM information indicates the access network device to release a resource related to the first session, where the resource related to the first session includes but is not limited to a data radio bearer resource between the terminal device and the access network device and an N3 tunnel resource between the access network device and the user plane function network element.

It may be understood that if the user plane connection deactivation result information indicates the unsuccessful deactivation of the user plane connection of the first session, the response message may include no N2 SM information.

Correspondingly, the mobility management network element receives the N2 SM information, and forwards the N2 SM information to the access network device through an N2 interface, for example, sends a resource release command to the access network device, where the resource release command includes the N2 SM information. The access network device releases the resource related to the first session. It may be understood that the resource release command may be of an existing message type, for example, a protocol data unit session resource release command message, or may be a message of another existing type or a future new type. This is not limited in this application. Optionally, the resource release command may further include the user plane connection deactivation result information and/or the cause value information of the unsuccessful deactivation.

For example, if the mobility management network element separately requests a plurality of session management network elements to deactivate user plane connections of different first sessions, the mobility management network element may send the resource release command to the access network device once after receiving response messages sent by all the session management network elements. Alternatively, the mobility management network element may send resource release commands to the access network device for a plurality of times.

After receiving the resource release command, the access network device interacts with the terminal device to release the resource related to the first session, for example, release resources on a Uu interface and an N3 interface, that is, release the data radio bearer resource and the N3 tunnel resource. After releasing the resource, the access network device sends a resource release response to the mobility management network element. After receiving the resource release response, the mobility management network element may send a service response message or a registration response message to the terminal device, where the service response message or the registration response message indicates user plane connection deactivation result information (or may be referred to as a user plane connection status of the at least one first session) of the at least one first session for which the user plane connection needs to be deactivated. The user plane connection deactivation result information is used to indicate successful or unsuccessful deactivation of the user plane connection of the at least one first session. If the deactivation result information indicates the unsuccessful deactivation of the user plane connection of the at least one first session, the service response message or the registration response message may further include cause value information of the unsuccessful deactivation.

Optionally, if a quantity of the at least one first session for which the user plane connection is requested to be deactivated is two or more, the mobility management network element may send the service response message or the registration response message to the terminal device again after receiving resource release responses of all first sessions.

In another possible implementation, if the resource release command sent by the mobility management network element to the access network device includes the user plane connection deactivation result information of the at least one first session for which the user plane connection needs to be deactivated and/or the cause value information of the unsuccessful deactivation, in a process in which the access network device interacts with the terminal device to release the resource related to the first session, the access network device may send, to the terminal device, the user plane connection deactivation result information of the at least one first session for which the user plane connection needs to be deactivated and/or the cause value information of the unsuccessful deactivation. That is, the service response message or the registration response message may be sent to the terminal device in a process in which the access network device interacts with the terminal device to release the resource.

FIG. 3 is a schematic flowchart of another session processing method according to an embodiment of this application. In this embodiment of this application, a first network element may be a session management network element. As shown in the figure, the session processing method in this embodiment of this application includes but is not limited to the following steps.

S200: When a quantity of sessions of a terminal device that each have an activated user plane connection is not less than a quantity threshold, the terminal device determines to deactivate a user plane connection of at least one first session, where the sessions that each have the activated user plane connection include the at least one first session.

For step S200 in this embodiment of this application, refer to step S100 in the embodiment in FIG. 2. Details are not described herein again.

S201: The terminal device sends a first request message to the session management network element, where the first request message includes indication information, and the indication information indicates to deactivate the user plane connection of the first session.

In an embodiment, the first request message may be a request message sent by the terminal device in a session management procedure. For example, the first request message may be a session modification request message or a session establishment request message. The first request message corresponds to one first session. For example, the first request message may include a session ID of the corresponding first session.

In a possible design, the indication information may be a newly added value in an existing information element. For example, the indication information may be a newly added cause value in a session modification cause value, where the cause value is used to indicate to deactivate the user plane connection of the first session, that is, requests to deactivate the user plane connection of the first session.

In another possible design, the indication information may alternatively be a newly added information element, for example, a user plane connection deactivation request (UPDR). The information element may include one bit, where the bit is 0 or 1, and the bit is used to indicate whether to deactivate the user plane connection of the first session, that is, whether to request to deactivate the user plane connection of the first session.

Optionally, the bit 0 may indicate not to deactivate the user plane connection of the first session, and the bit 1 may indicate to deactivate the user plane connection of the first session. Certainly, alternatively, the bit 0 may indicate to deactivate the user plane connection of the first session, and the bit 1 may indicate not to deactivate the user plane connection of the first session. This is not limited in this embodiment of this application. Herein, that the bit 0 indicates not to deactivate the user plane connection of the first session, and the bit 1 indicates to deactivate the user plane connection of the first session is used as an example. For example, the bit 0 may be a default value. If the user plane connection of the first session needs to be deactivated, the bit of the information element only needs to be set to 1.

Optionally, an indication manner in which the indication information indicates to deactivate the user plane connection of the first session includes but is not limited to indicating to modify or reestablish the first session to a session using control plane optimization, indicating to modify or reestablish the first session to a session for which no user plane connection is established, or the like. This is not limited in this embodiment of this application.

Modifying or reestablishing the first session to the session using the control plane optimization may be modifying or reestablishing the first session to a session using control plane CIoT optimization and not using N3 data transmission. In this implementation, the sessions of the terminal device that each have the activated user plane connection may include but are not limited to the following sessions: a session using the control plane CIoT optimization and using the N3 data transmission, a session using user plane CIoT optimization, or a session not using CIoT optimization.

It should be understood that not using the N3 data transmission means that no user plane connection is established for a corresponding session, and data corresponding to the corresponding session is transmitted by using a control plane.

For example, in some possible application scenarios, for example, when the terminal device is handed over from accessing a network over a non-narrow band internet of things to accessing the network over a narrow band internet of things, the session management network element may determine, based on one or more of a local policy, a network configuration, or user subscription data, to release one or more sessions, send a release instruction to the terminal device, where the release instruction instructs whether to reestablish the released session. When the terminal device receives the release command, and determines that a sum of a quantity of sessions that each have a user plane connection and that are reserved by the session management network element and a quantity of sessions that the session management network element needs to release and reestablish is greater than the quantity threshold, the terminal device may initiate a session establishment procedure when receiving a release command instructing to reestablish a session. For example, the terminal device sends the session establishment request message (namely, the first request message), where the session establishment request message includes the indication information, and the indication information indicates not to establish the user plane connection for the first session (in other words, indicates to deactivate the user plane connection of the first session), so that a quantity of sessions of the terminal device that each have an activated user plane connection is not greater than the quantity threshold. The session management network element determines to release and reestablish the first session. Alternatively, the terminal device may initiate a session modification procedure. For example, the terminal device sends the session modification request (namely, the first request message), where the session modification request includes the indication information, and the indication information indicates to deactivate the user plane connection of the first session. The session management network element determines to reserve the first session.

It may be understood that the session management network element determines to release and reestablish the first session, and/or the session management network element determines to reserve the first session. This is not limited in this application. The foregoing descriptions are merely examples.

Optionally, the session modification request message or the session establishment request message may be included in an uplink NAS transport message and sent to a mobility management network element. The mobility management network element invokes a session context update (for example, UpdateSMContext) service operation of a service-oriented interface (for example, Nsmf_PDUSession) of the session management network element, and sends a session context update message, where the session context update message includes the session modification request message or the session establishment request message.

For example, if the indication information in the first request message indicates to modify or reestablish the first session to the session using the control plane optimization, before sending the session context update message, the mobility management network element may further determine whether the first session can be modified or reestablished to the session using the control plane optimization. If the mobility management network element determines that the first session can be modified or reestablished to the session using the control plane optimization, the mobility management network element sends the session context update message to the session management network element, where the session context update message includes the session modification request message or the session establishment request message, and indicates to modify or reestablish the first session to the session using the control plane optimization.

If the mobility management network element determines that the first session cannot be modified or reestablished to the session using the control plane optimization, the mobility management network element returns information sent by the terminal device to the terminal device through a downlink NAS transport message, and carries cause value information of forwarding disabled. The cause value information includes but is not limited to the following: 1. Control plane congestion occurs. 2. A quantity of sessions using the control plane optimization has reached a maximum value. 3. A network side does not support using of the control plane optimization. 4. Another possible cause. In this case, step S202 is not performed. Certainly, the mobility management network element does not forward the session modification request message or the session establishment request message either.

S202: The session management network element deactivates the user plane connection of the first session based on the indication information.

In some possible scenarios, before deactivating the user plane connection of the first session, the session management network element may further determine, based on one or more of the local policy, the network configuration, or the user subscription data, whether the user plane connection of the requested first session can be deactivated. If the user plane connection of the first session can be deactivated, the session management network element deactivates the user plane connection of the first session based on the indication information. That is, the user plane connection of the first session is successfully deactivated. If the user plane connection of the first session cannot be deactivated, the session management network element does not deactivate the user plane connection of the first session. That is, the user plane connection of the first session is unsuccessfully deactivated. For specific cause value information, refer to descriptions in subsequent embodiments. Details are not described herein. It may be understood that, that the user plane connection is unsuccessfully deactivated in this application may also mean that the session management network element fails in a user plane connection deactivation process, and consequently the user plane connection of the first session is unsuccessfully deactivated.

That the session management network element deactivates the user plane connection of the first session may mean that the session management network element interacts with a user plane function network element (where the user plane function network element is associated with the first session), to release an N3 tunnel resource of the first session.

For details, refer to descriptions in subsequent embodiments. Details are not described herein.

Further, optionally, the session management network element may further send a response message to the mobility management network element, where the response message includes user plane connection deactivation result information of the first session. The user plane connection deactivation result information indicates successful or unsuccessful deactivation of the user plane connection of the first session. If the user plane connection deactivation result information indicates the unsuccessful deactivation of the user plane connection of the first session, the response message may further include cause value information of the unsuccessful deactivation of the user plane connection. The cause value information includes one or more of the following information: The first session is to be released, the control plane congestion occurs, the quantity of sessions using the control plane optimization reaches the maximum value, a network does not support the control plane optimization, deactivation of the user plane connection is not allowed, a user plane connection of another session is deactivated, or the like. This is not limited in this embodiment of this application. The following describes each piece of cause value information by using an example.

1. The first session is to be released. For example, when the terminal device is handed over from accessing the network over the non-narrow band internet of things to accessing the network over the narrow band internet of things, the session management network element determines whether the first session for which the user plane connection is requested to be deactivated is to be released by the session management network element. If the first session is to be released by the session management network element, the session management network element may refuse to deactivate the user plane connection of the first session, and return refuse cause value information, where the refuse cause value information includes but is not limited to the following: 1. The first session is to be released. 2. The first session is to be released and reestablished. 3. Another possible cause. The refuse cause value information may be sent to the mobility management network element via the response message. For details, refer to the descriptions in the foregoing embodiment. The details are not described herein again.

It may be understood that when the session management network element releases the first session, the user plane connection of the first session is deactivated, and the session management network element may not deactivate the user plane connection of the first session for the indication information. Therefore, it may be considered that the session management network element refuses to deactivate the user plane connection of the first session, and returns a refuse message.

2. The control plane congestion occurs, the quantity of sessions using the control plane optimization reaches the maximum value, or the network does not support the control plane optimization. For another example, if the indication information indicates to modify or reestablish the first session to the session using the control plane optimization, the session management network element may determine, based on one or more of the local policy, the network configuration, or the user subscription data, whether the first session can be modified to the session using the control plane optimization. If the first session can be modified to the session using the control plane optimization, the first session is modified, based on the indication information, to the session using the control plane optimization, so that a quantity of sessions of the terminal device that each have an activated user plane connection is less than or equal to the quantity threshold. If the first session cannot be modified to the session using the control plane optimization, the unsuccessful deactivation of the user plane connection is returned. Optionally, cause value information of control plane optimization using disabled may be further carried. The cause value information of control plane optimization using disabled includes but is not limited to the following: 1. The control plane congestion occurs. 2. The quantity of sessions using the control plane optimization has reached the maximum value. 3. The network side does not support the control plane optimization. 4. Another possible cause. The cause value information of control plane optimization using disabled may be sent to the mobility management network element via the response message. For details, refer to the descriptions in the foregoing embodiment. The details are not described herein again.

3. The deactivation of the user plane connection is not allowed, or the user plane connection of the another session is deactivated. For another example, the session management network element may alternatively choose, based on one or more of the local policy, the network configuration, or the user subscription data, to deactivate the user plane connection of the another session (not the first session indicated by the mobility management network element). For example, the indication information indicates to deactivate a user plane connection of a session 1 and a user plane connection of a session 3, and the session management network element may determine, based on one or more of the local policy, the network configuration, or the user subscription data, that the user plane connection of the session 3 cannot be deactivated and a user plane connection of a session 4 may be deactivated. Therefore, the session management network element may deactivate the user plane connection of the session 1 and the user plane connection of the session 4, and return unsuccessful deactivation of the user plane connection of the session 3 and cause value information of the unsuccessful deactivation of the user plane connection, where the cause value information of the unsuccessful deactivation of the user plane connection may be that the user plane connection of the another session is deactivated, that the deactivation of the user plane connection of the session is not allowed, or another possible cause. The cause value information may be sent to the mobility management network element via the response message. For details, refer to the descriptions in the foregoing embodiment. The details are not described herein again.

For example, in this embodiment, the response message may be a session modification response message or a session establishment response message. The session modification response message or the session establishment response message may be included in a session context update response message. In a possible design, the session context update response message may include N1 SM information (where the N1 SM information is session-related information sent by the session management network element to the terminal device). The N1 SM information includes the session modification response message or the session establishment response message.

Optionally, the session modification response message may include a session modification accept message or a session modification refuse message, and the session establishment response message may include a session establishment accept message or a session establishment refuse message. The session modification response message or the session establishment response message includes the user plane connection deactivation result information, and the user plane connection deactivation result information is used to indicate the successful or unsuccessful deactivation of the user plane connection of the first session.

In a possible design, if the user plane connection of the first session is successfully deactivated, the N1 SM information in the session context update response message may include the session modification accept message or the session establishment accept message, where the session modification accept message or the session establishment accept message includes the user plane connection deactivation result information, and the user plane connection deactivation result information indicates the successful deactivation of the user plane connection of the first session (for example, an indication of successful reestablishment of a session that has no user plane connection, an indication of successful modification of the session using the control plane optimization, or an indication of successful reestablishment of the session using the control plane optimization). If the user plane connection of the first session is unsuccessfully deactivated, the N1 SM information may include the session modification refuse message or the session establishment refuse message, where the session modification refuse message or the session establishment refuse message includes the user plane connection deactivation result information, and the user plane connection deactivation result information indicates the unsuccessful deactivation of the user plane connection of the first session. Further, optionally, the session modification refuse message or the session establishment refuse message may further include the cause value information of the unsuccessful deactivation of the user plane connection. For the cause value information, refer to the descriptions in the foregoing embodiment. Details are not described herein again.

It may be understood that, alternatively, the session modification refuse message or the session establishment refuse message may include the user plane connection deactivation result information, and the user plane connection deactivation result information indicates the successful deactivation of the user plane connection of the first session. In this case, the session modification accept message or the session establishment accept message includes the user plane connection deactivation result information, and the user plane connection deactivation result information indicates the unsuccessful deactivation of the user plane connection of the first session. This is not limited in this embodiment of this application, and the foregoing descriptions are merely examples.

For example, if the user plane connection deactivation result information indicates the successful deactivation of the user plane connection of the first session, the session context update response message may further include N2 SM information (where the N2 SM information is session-related information sent by the session management network element to an access network device). The N2 SM information indicates the access network device to release a resource related to the first session, where the resource related to the first session includes but is not limited to a data radio bearer resource between the terminal device and the access network device and an N3 tunnel resource between the access network device and the user plane function network element.

It may be understood that if the user plane connection deactivation result information indicates the unsuccessful deactivation of the user plane connection of the first session, the response message may include no N2 SM information.

Correspondingly, the mobility management network element receives the N2 SM information, and forwards the N2 SM information to the access network device through an N2 interface, for example, sends a resource release command to the access network device, where the resource release command includes the N2 SM information. The access network device releases the resource related to the first session. It may be understood that the resource release command may be of an existing message type, for example, a protocol data unit session resource release command message, or may be a message of another existing type or a future new type. This is not limited in this application. Optionally, the resource release command may further include the user plane connection deactivation result information and/or the cause value information of the unsuccessful deactivation.

After receiving the resource release command, the access network device interacts with the terminal device to release the resource related to the first session, for example, release resources on a Uu interface and an N3 interface, that is, release the data radio bearer resource and the N3 tunnel resource. After releasing the resource, the access network device sends a resource release response to the mobility management network element. After receiving the resource release response, the mobility management network element may send the session modification response message or the session establishment response message to the terminal device, where the session modification response message or the session establishment response message indicates the user plane connection deactivation result information (or may be referred to as a user plane connection status of the first session) of the first session for which the user plane connection needs to be deactivated. The user plane connection deactivation result information is used to indicate the successful or unsuccessful deactivation of the user plane connection of the at least one first session. If the deactivation result information indicates the unsuccessful deactivation of the user plane connection of the first session, the session modification response message or the session establishment response message further includes the cause value information of the unsuccessful deactivation. For details, refer to the descriptions in the foregoing embodiment.

In another possible implementation, if the resource release command sent by the mobility management network element to the access network device includes the user plane connection deactivation result information of the first session for which the user plane connection needs to be deactivated, in a process in which the access network device interacts with the terminal device to release the resources on the Uu interface and the N3 interface, the access network device may send, to the terminal device, the user plane connection deactivation result information of the first session for which the user plane connection needs to be deactivated. That is, the session modification response message or the session establishment response message may be sent to the terminal device in a process in which the access network device interacts with the terminal device to release the resources.

Figure 4A:
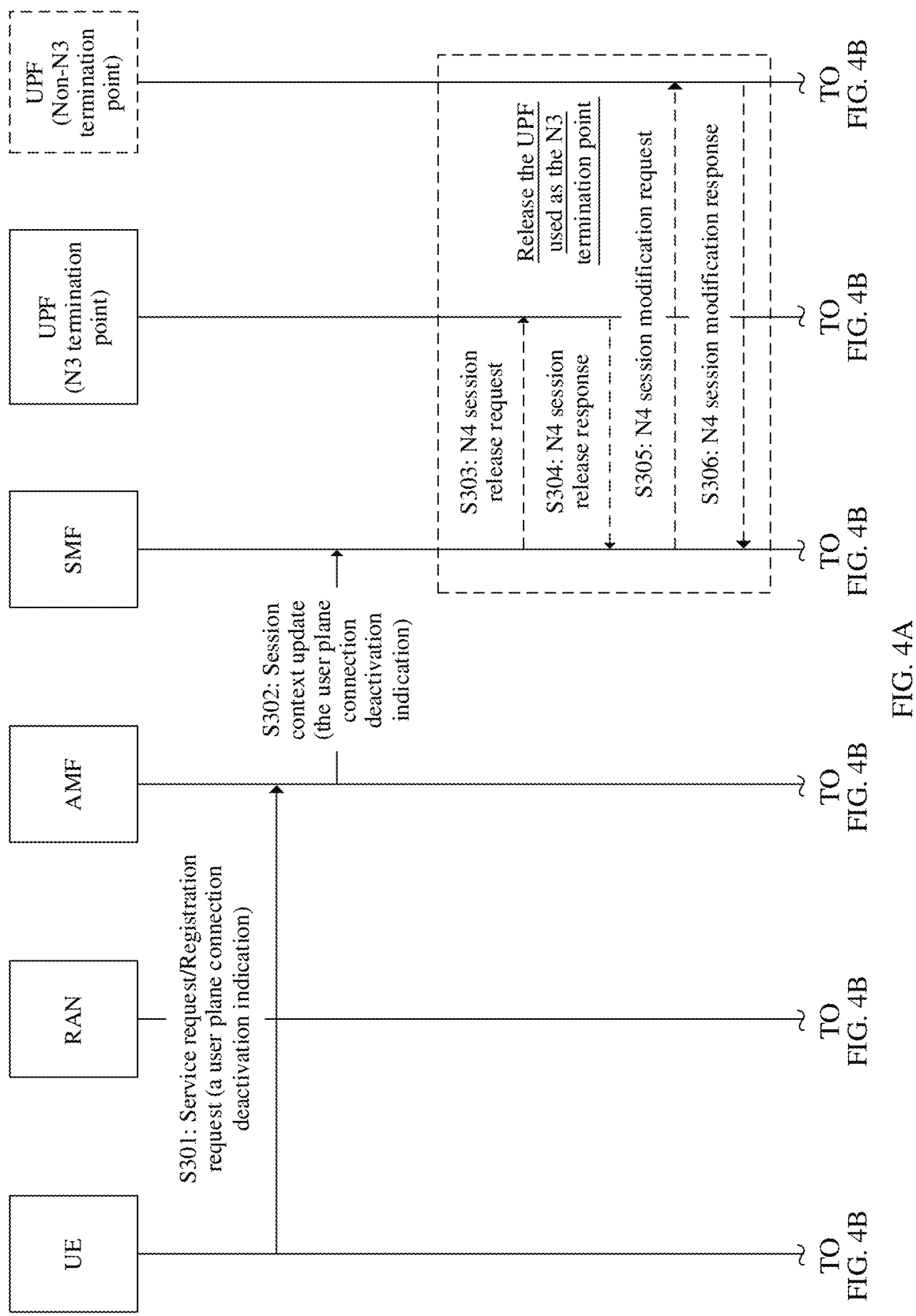
FIG. 4A and FIG. 4B are a schematic flowchart of deactivating a user plane connection in a mobility management procedure according to an embodiment of this application.
Figure 4B:
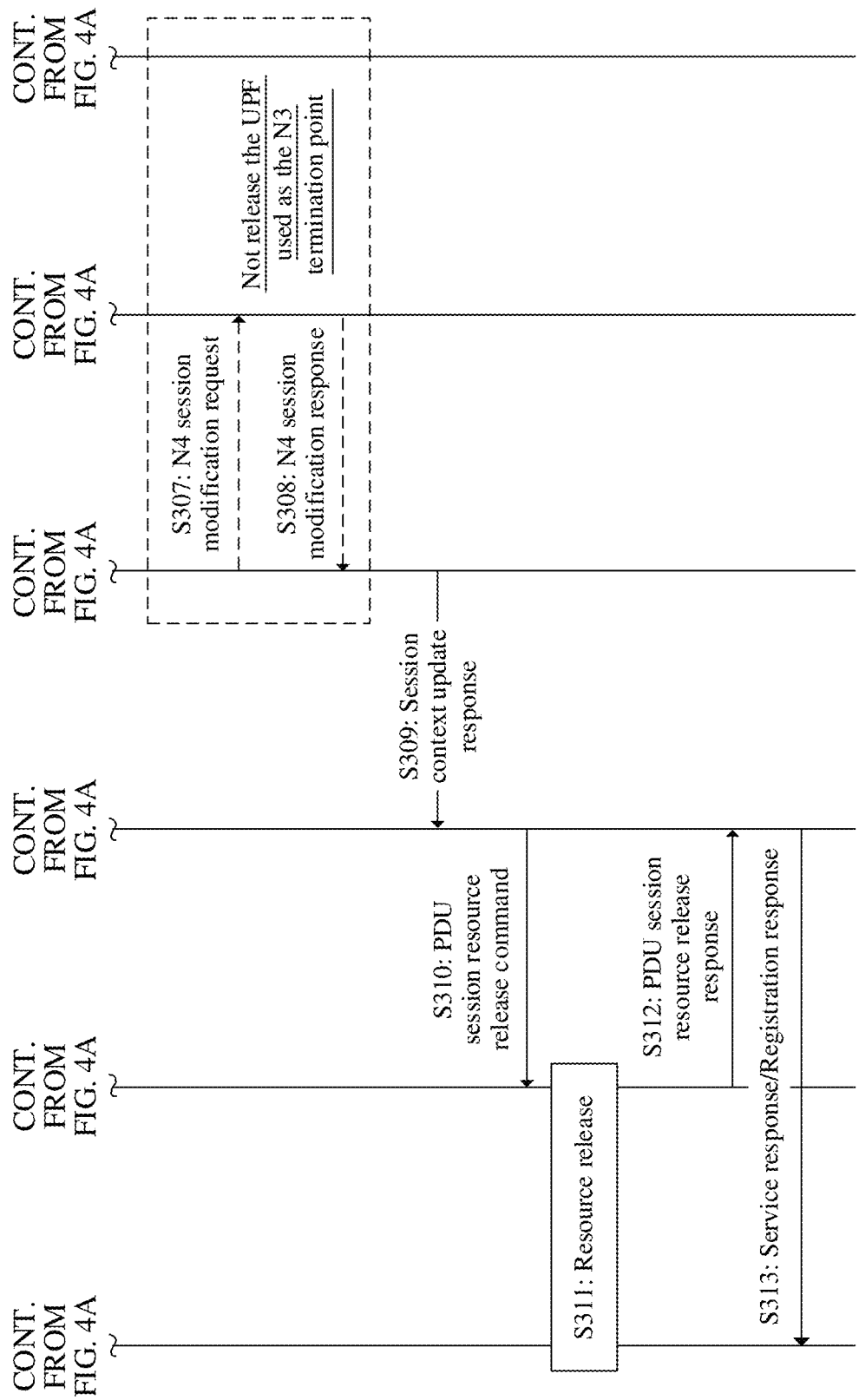

The method shown in FIG. 2 is described in more detail with reference to FIG. 4A and FIG. 4B. For ease of understanding, an example in which a terminal device is UE, a mobility management network element is an AMF, an access network device is a RAN, a session management network element is an SMF, and a user plane function network element is a UPF is used for description in FIG. 4A and FIG. 4B. In a subsequent embodiment, indication information is referred to as a user plane connection deactivation indication.

S301: The UE sends a service request message or a registration request message to the AMF when a quantity of sessions of UE that each have an activated user plane connection is not less than a quantity threshold, where the service request message or the registration request message includes the user plane connection deactivation indication, and the user plane connection deactivation indication indicates to deactivate a user plane connection of one or more first sessions.

In a possible design, the user plane connection deactivation indication may be information about a list of session user plane connections to be deactivated. The information about a list of session user plane connections to be deactivated includes a session identity (ID) list. The session ID list includes a session ID of the at least one first session. The session ID list is used to indicate that a user plane connection of a corresponding session is to be deactivated. The information about a list of session user plane connections to be deactivated may be a newly added value in an existing information element, or may be a newly added information element.

In another possible design, the user plane connection deactivation indication may be bit information. If a user plane connection of one first session needs to be deactivated, the user plane connection deactivation indication includes one bit. If user plane connections of a plurality of first sessions need to be deactivated, the user plane connection deactivation indication may include a plurality of bits, where a bit set or a bit list may include the plurality of bits. One bit corresponds to one first session.

Optionally, a bit 0 may indicate not to deactivate a user plane connection of a corresponding first session, and a bit 1 may indicate to deactivate a user plane connection of a corresponding first session. Certainly, alternatively, a bit 0 may indicate to deactivate a user plane connection of a corresponding first session, and a bit 1 may indicate not to deactivate a user plane connection of a corresponding first session. This is not limited in this embodiment of this application.

The following uses an example in which the bit 0 indicates not to deactivate the user plane connection of the corresponding first session, and the bit 1 indicates to deactivate the user plane connection of the corresponding first session. For example, in a 5G system, the terminal device may have a maximum of 15 sessions. As shown in Table 2, PDU session ID (PSI)(1) corresponds to a session whose session ID is 1, PSI(2) corresponds to a session whose session ID is 2, and so on. If the quantity of sessions of the terminal device that each have the activated user plane connection is 3, the quantity threshold is 2, and UE requests to deactivate a user plane connection of one first session, for example, to deactivate the session whose session ID is 1, a bit of PSI(1) in Table 2 is set to 1. Optionally, remaining bits are set to 0. For example, the bit 0 may be a default value. In this case, the bit of PSI(1) may only need to be set to 1. If the quantity of sessions of the terminal device that each have the activated user plane connection is 5, the quantity threshold is 3, and the UE requests to deactivate user plane connections of two first sessions, for example, to deactivate the session whose session ID is 1 and the session whose ID is 2, a bit of PSI(1) and a bit of PSI(2) in Table 2 are set to 1. Optionally, remaining bits are set to 0. For example, the bit 0 may be a default value. In this case, the bit of PSI(1) and the bit of PSI(2) may only need to be set to 1.

TABLE 2

| PSI(7) | PSI(6) | PSI(5) | PSI(4) | PSI(3) | PSI(2) | PSI(1) | PSI(0) |
|---|---|---|---|---|---|---|---|
| PSI(15) | PSI(14) | PSI(13) | PSI(12) | PSI(11) | PSI(10) | PSI(9) | PSI(8) |

S302: The AMF sends a session context update message to the SMF, where the session context update message includes the user plane connection deactivation indication. Optionally, the session context update message may further include cause value information of user plane connection deactivation.

The session context update message includes the user plane connection deactivation indication, and the user plane connection deactivation indication indicates to deactivate the user plane connection of the first session. Optionally, one session context update message may correspond to one first session. For example, the session context update message may include a session ID of the first session. The user plane connection deactivation indication in the second request message may be one-bit information, and the bit information is used to indicate whether to deactivate a user plane connection of the first session.

Optionally, the bit 0 may indicate not to deactivate the user plane connection of the first session, and the bit 1 may indicate to deactivate the user plane connection of the first session. Certainly, alternatively, the bit 0 may indicate to deactivate the user plane connection of the first session, and the bit 1 may indicate not to deactivate the user plane connection of the first session. This is not limited in this embodiment of this application. Herein, that the bit 0 indicates not to deactivate the user plane connection of the first session, and the bit 1 indicates to deactivate the user plane connection of the first session is used as an example. For example, the bit 0 may be the default value. If the user plane connection of the first session needs to be deactivated, the bit only needs to be set to 1.

It should be noted that if the UE needs to deactivate user plane connections for more than one session, and a plurality of SMFs are involved, the AMF separately sends the session context update message to the plurality of SMFs, to request the SMFs to deactivate corresponding first sessions, where the first sessions corresponding to the SMFs may be managed by the SMFs.

Correspondingly, the SMF receives the session context update messages, and deactivates the user plane connections of the first sessions based on the indication information. Optionally, in some optional scenarios, for example, in a scenario in which a RAT type of a RAN accessed by the UE is handed over from a non-NB-IoT to an NB-IoT, the SMFs determine, based on one or more of a local policy, a network configuration, or user subscription data, to release sessions. If the first sessions requested to be deactivated in the indication information match the sessions to be released by the SMFs, the SMFs may not deactivate the user plane connections of the first sessions based on the indication information, but release the first sessions. In this scenario, no subsequent step is performed.

Optionally, in some optional scenarios, the SMF determines, based on one or more of a local policy, a network configuration, or user subscription data, that the user plane connection of the first session cannot be deactivated, and another session is deactivated.

When deactivating the user plane connection of the first session, the SMF may release or not release a UPF used as an N3 termination point. Releasing the UPF used as the N3 termination point means that an N3 tunnel of the first session no longer exists after the UPF is released. In this embodiment, if the UPF used as the N3 termination point is released, steps S303 to S306 are performed; or if the UPF used as the N3 termination point is not released, steps S307 and S308 are performed. Details are separately described below.

S303: The SMF sends an N4 session release request to the UPF used as the N3 termination point.

S304: After the N3 termination point is released, the UPF used as the N3 termination point sends an N4 session release response to the SMF.

S305 and S306: The SMF initiates an N4 session modification procedure to a UPF not used as the N3 termination point, to indicate the UPF not used as the N3 termination point to remove N9 tunnel information of a specified first session.

S307 and S308: The SMF initiates the N4 session modification procedure to the UPF used as the N3 termination point, to indicate the UPF used as the N3 termination point to remove N3 tunnel information of the specified first session.

S309: The SMF sends a session context update response message to the AMF, where the session context update response message includes user plane connection deactivation result information, and the user plane connection deactivation result information indicates successful or unsuccessful deactivation of the user plane connection of the requested first session.

Optionally, if deactivation succeeds, the session context update response message may further include N2 SM information (session-related information sent by the SMF to the RAN), where the N2 SM information indicates the RAN to release a resource related to the first session, including a DRB between the UE and the RAN and an N3 tunnel between the RAN and the UPF.

If deactivation does not succeed (for example, the SMF needs to release the first session), the session context update response message may further carry cause value information of the unsuccessful deactivation. For example, the SMF determines to release the session. It may be understood that if the SMF determines to release the session, the session context update response message includes no N2 SM information. For another example, the another session is deactivated.

S310: The AMF forwards the received N2 SM information to the RAN through an N2 interface, that is, sends a resource release command to the RAN. If the user plane connections of the plurality of sessions need to be deactivated, and the plurality of SMFs are involved, the AMF may send PDU session resource release commands to the RAN for a plurality of times without waiting for session context update response messages sent by all the SMFs. Certainly, the AMF alternatively may send the resource release command to the RAN once after receiving session context update response messages sent by all the SMFs. For the latter, the resource release command needs to specify that resources related to the plurality of first sessions need to be released.

S311: After receiving the PDU resource release command, the RAN releases resources on a Uu interface and an N3 interface, that is, releases the DRB and the N3 tunnel information.

S312: After releasing the resources, the RAN sends a resource release response to the AMF. If resources of a plurality of sessions need to be released, the AMF may send a service response message or a registration response message to the UE after receiving resource release responses of all the sessions.

S313: The AMF sends the service response message or the registration response message to the UE, where the service response message or the registration response message includes the user plane connection deactivation result information, where the user plane connection deactivation result information indicates successful or unsuccessful deactivation of the user plane connection of the requested at least one first session. If the deactivation does not succeed, the service response message or the registration response message further includes cause value information of the unsuccessful deactivation. For example, the first session is to be released, the deactivation of the user plane connection is not allowed, or a user plane connection of another session is deactivated. For details, refer to the descriptions in the foregoing embodiment. The details are not described herein again.

It may be understood that step S313 may alternatively be integrated into steps S310 and S311. That is, the RAN sends the service response message or the registration response message to the UE in a resource release process. This is not limited in this embodiment of this application.

Figure 5A:
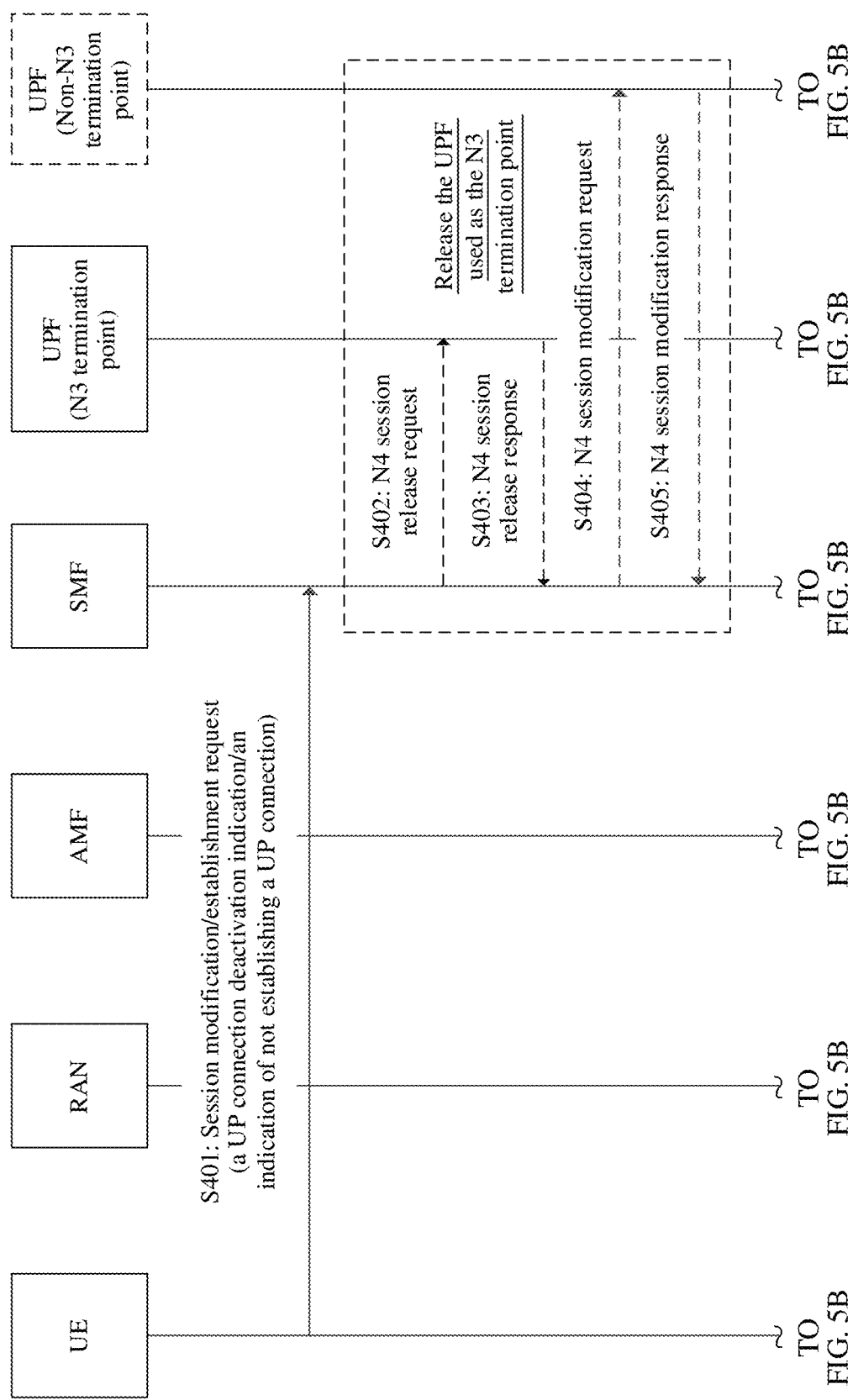
FIG. 5A and FIG. 5B are a schematic flowchart of deactivating a user plane connection in a session management procedure according to an embodiment of this application.
Figure 5B:
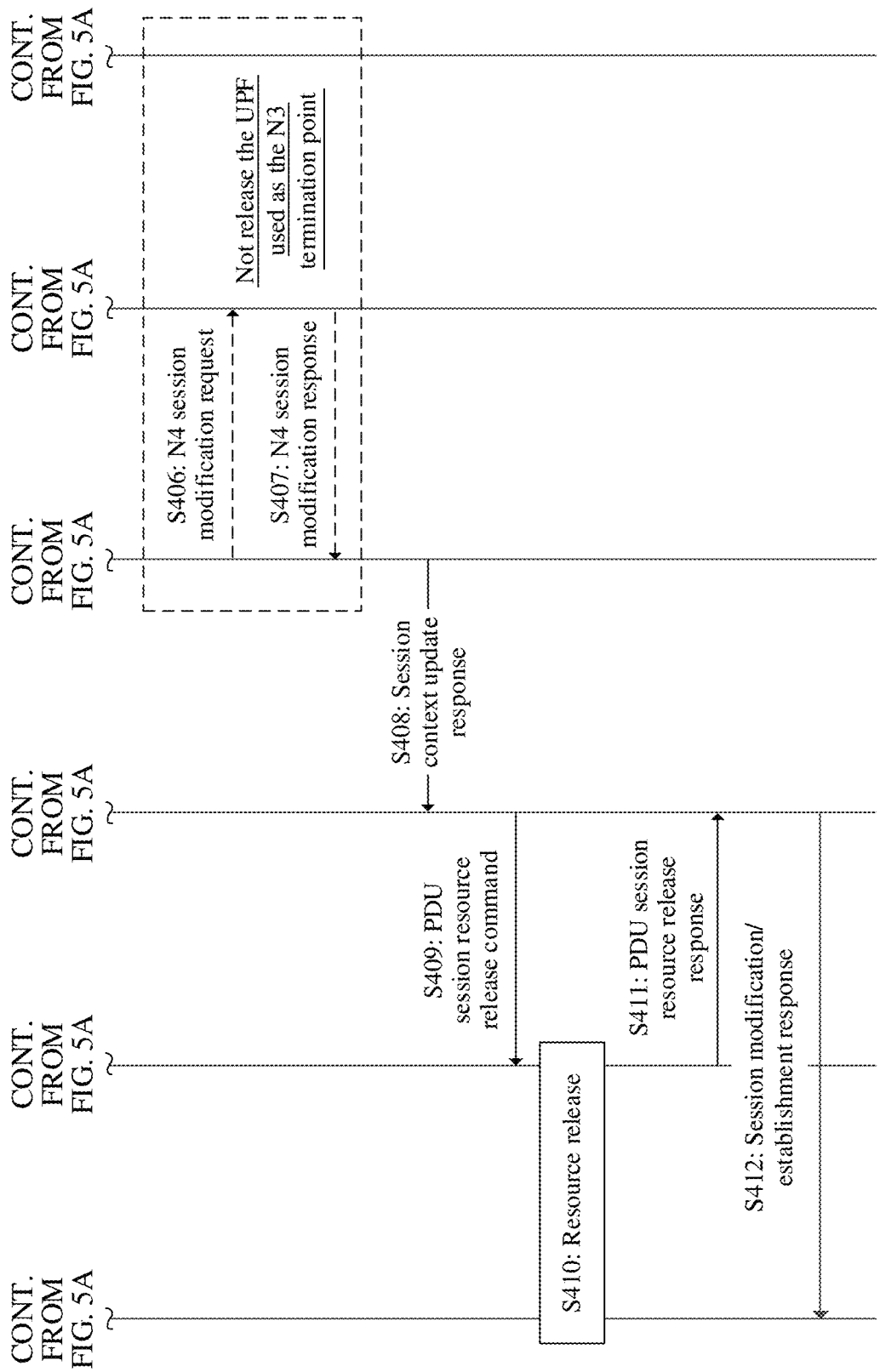
Figure 6A:
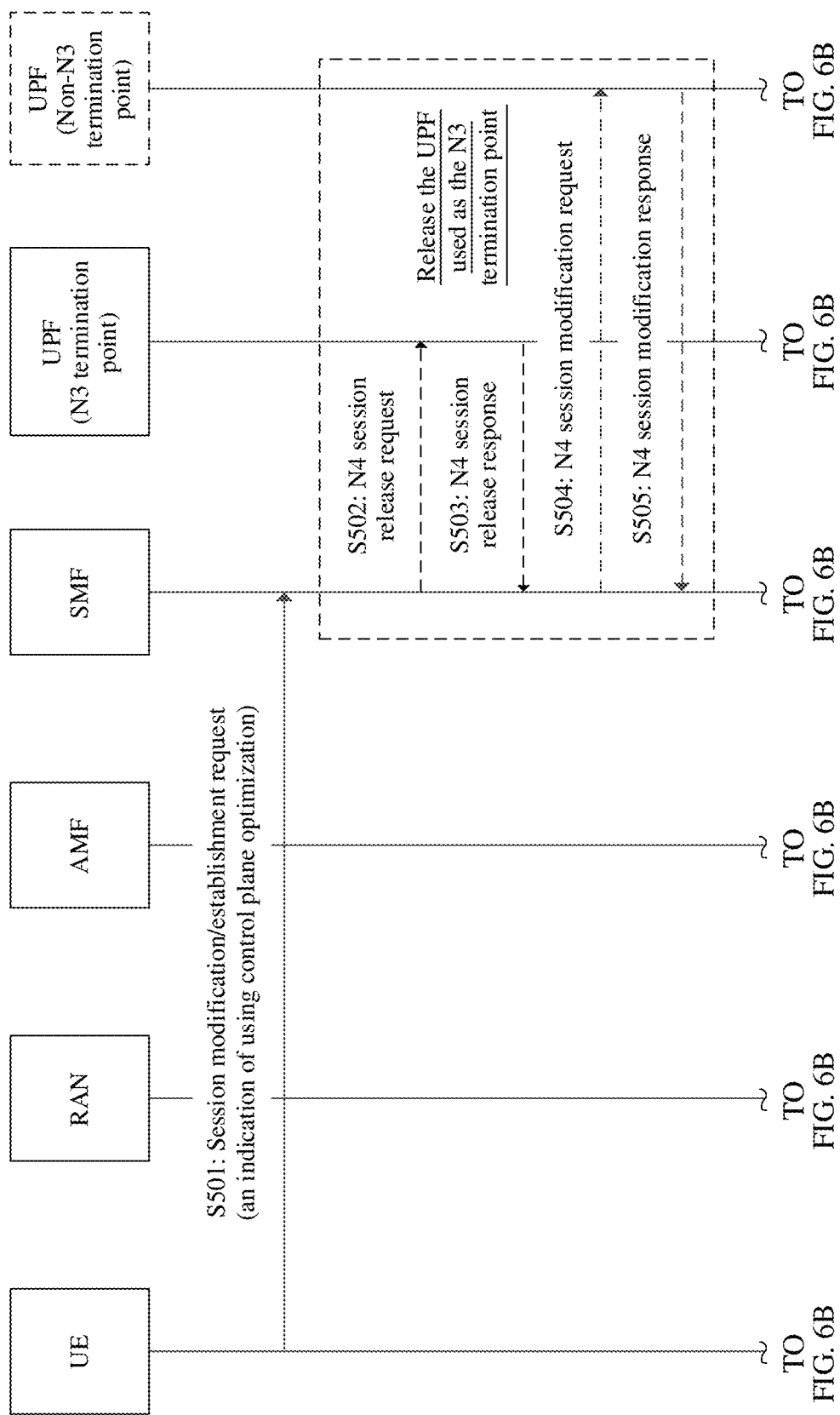
FIG. 6A and FIG. 6B are a schematic flowchart of deactivating a user plane connection in another session management procedure according to an embodiment of this application.
Figure 6B:
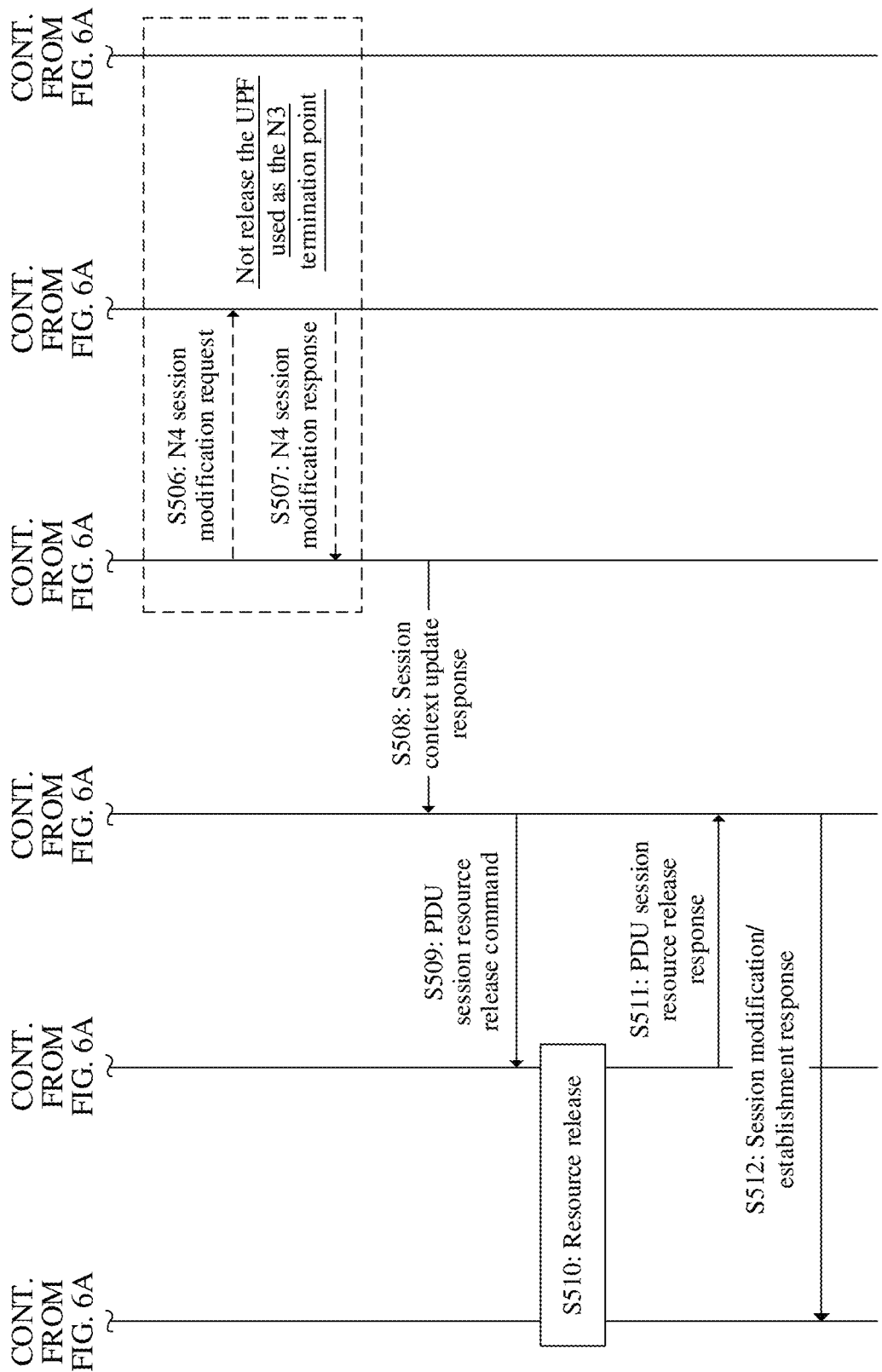

The method shown in FIG. 3 is described in more detail with reference to FIG. 5A to FIG. 6B. For ease of understanding, an example in which a terminal device is UE, a mobility management network element is an AMF, an access network device is a RAN, a session management network element is an SMF, and a user plane function network element is a UPF is used for description in FIG. 5A to FIG. 6B. In FIG. 5A and FIG. 5B, indication information may be a user plane connection deactivation indication or an indication of not establishing a user plane connection. In FIG. 6A and FIG. 6B, indication information may be an indication of using control plane optimization. In FIG. 6A and FIG. 6B, using control plane CIoT optimization and not using N3 data transmission is used as an example for description of using the control plane optimization. The following separately provides descriptions with reference to FIG. 5A to FIG. 6B.

As shown in FIG. 5A and FIG. 5B, a session processing method in this scenario includes but is not limited to the following steps.

S401: The UE sends a session modification request message or a session establishment request message to the SMF when a quantity of sessions of the UE that each have an activated user plane connection is not less than a quantity threshold. For the session establishment request message, the message may include the indication information, indicating the SMF to reestablish a first session to a session for which no user plane connection is established. For the session modification request message, the message may include the user plane connection deactivation indication, indicating the SMF to deactivate a user plane connection of the first session.

The session modification request message or the session establishment request message may correspond to one first session. For example, the session modification request message or the session establishment request message may include a session ID of the corresponding first session.

In a possible design, the indication information may be a newly added value in an existing information element. For example, the indication information may be a newly added cause value in a session modification cause value in the session modification request message, where the cause value is used to indicate to deactivate the user plane connection of the first session, that is, requests to deactivate the user plane connection of the first session.

In another possible design, the indication information may alternatively be a newly added information element, for example, a user plane connection deactivation request (UPDR). The information element may include one bit, where the bit is 0 or 1, and the bit is used to indicate whether to deactivate the user plane connection of the first session, that is, whether to request to deactivate the user plane connection of the first session.

Optionally, the bit 0 may indicate not to deactivate the user plane connection of the first session, and the bit 1 may indicate to deactivate the user plane connection of the first session. Certainly, alternatively, the bit 0 may indicate to deactivate the user plane connection of the first session, and the bit 1 may indicate not to deactivate the user plane connection of the first session. This is not limited in this embodiment of this application. Herein, that the bit 0 indicates not to deactivate the user plane connection of the first session, and the bit 1 indicates to deactivate the user plane connection of the first session is used as an example. For example, the bit 0 may be a default value. If the user plane connection of the first session needs to be deactivated, the bit of the information element only needs to be set to 1.

Optionally, the session modification request message or the session establishment request message may be included in an uplink NAS transport message and sent to the AMF. The AMF invokes a session context update (for example, UpdateSMContext) service operation of a service-oriented interface (for example, Nsmf_PDUSession) of the SMF, and sends a session context update message to the SMF, where the session context update message includes the session modification request message or the session establishment request message.

Correspondingly, the SMF receives the session modification request message or the session establishment request message, and deactivates a user plane connection of at least one first session based on the indication information.

Optionally, in some optional scenarios, for example, in a scenario in which a RAT type of a RAN accessed by the UE is handed over from a non-NB-IoT to an NB-IoT, the SMF determines, based on one or more of a local policy, a network configuration, or user subscription data, to release a session. If the first session requested to be deactivated in the indication information matches the session to be released by the SMF, the SMF may not deactivate the user plane connection of the first session based on the indication information, but release the first session. In this scenario, no subsequent step is performed.

Optionally, in some optional scenarios, the SMF determines, based on one or more of a local policy, a network configuration, or user subscription data, that the user plane connection of the first session cannot be deactivated, and another session is deactivated.

When deactivating the user plane connection of the first session, the SMF may release or not release a UPF used as an N3 termination point. Releasing the UPF used as the N3 termination point means that an N3 tunnel of the first session no longer exists after the UPF is released. In this embodiment, if the UPF used as the N3 termination point is released, steps S402 to S405 are performed; or if the UPF used as the N3 termination point is not released, steps S406 and S407 are performed. Details are separately described below.

S402: The SMF sends an N4 session release request to the UPF used as the N3 termination point.

S403: After the N3 termination point is released, the UPF used as the N3 termination point sends an N4 session release response to the SMF.

S404 and S405: The SMF initiates an N4 session modification procedure to a UPF not used as the N3 termination point, to indicate the UPF not used as the N3 termination point to remove N9 tunnel information of a specified first session.

S406 and S407: The SMF initiates the N4 session modification procedure to the UPF used as the N3 termination point, to indicate the UPF used as the N3 termination point to remove N3 tunnel information of the specified first session.

S408: The SMF sends a session context update response message to the AMF, where the session context update response message includes N1 SM information (where the N1 SM information is session-related information sent by the SMF to the UE). The N1 SM information includes user plane connection deactivation result information, and the user plane connection deactivation result information indicates successful or unsuccessful deactivation of the user plane connection of the requested first session.

Optionally, if the deactivation succeeds, the session context update response message includes the N1 SM information, where the N1 SM information includes a session modification accept message or a session establishment accept message, the session modification accept message or the session establishment accept message includes the user plane connection deactivation result information, and the user plane connection deactivation result information indicates the successful deactivation of the user plane connection of the requested first session.

Further, the session context update response message may further include N2 SM information (session-related information sent by the SMF to the RAN), where the N2 SM information indicates the RAN to release a resource related to the first session, including a DRB between the UE and the RAN and the N3 tunnel between the RAN and the UPF.

Optionally, if the deactivation does not succeed, for example, if the first session for which the terminal device requests to deactivate the user plane connection matches the session that the SMF determines to release, the session context update response message includes the N1 SM information, the N1 SM information includes a session modification refuse message or a session establishment refuse message, the session modification refuse message or the session establishment refuse message includes the user plane connection deactivation result information, and the user plane connection deactivation result information indicates the unsuccessful deactivation of the user plane connection of the requested first session.

Further, the session modification refuse message or the session establishment refuse message may further include cause value information of modification refuse or establishment refuse. The cause value information may be that the first session is to be released, the deactivation of the user plane connection is not allowed, a user plane connection of another session is deactivated, or the like.

It may be understood that, alternatively, the session modification refuse message or the session establishment refuse message may include the user plane connection deactivation result information used to indicate the successful deactivation of the first session, and the session modification acceptation message or the session establishment acceptation message includes the user plane connection deactivation result information used to indicate the unsuccessful deactivation of the first session. This is not limited in this embodiment of this application.

S409: The AMF forwards the received N2 SM information to the RAN through an N2 interface, that is, sends a resource release command to the RAN.

S410: After receiving the PDU resource release command, the RAN releases resources on a Uu interface and an N3 interface, that is, releases a DRB resource and an N3 tunnel resource.

S411: After releasing the resources, the RAN sends a resource release response to the AMF. If resources of a plurality of sessions need to be released, the AMF may send the received session modification accept message, session modification refuse message, session establishment accept message, or session establishment refuse message to the UE after receiving resource release responses of all the sessions.

S412: The AMF sends the received session modification accept message, session modification refuse message, session establishment accept message, or session establishment refuse message to the UE, where the message includes the user plane connection deactivation result information. If the user plane connection deactivation result information indicates that the unsuccessful deactivation of the user plane connection of the at least one first session, the message may further include cause value information of the unsuccessful deactivation. For example, the first session is to be released session, the deactivation of the user plane connection is not allowed, the user plane connection of the another session is deactivated, or the like.

It may be understood that step S412 may alternatively be integrated into steps S409 and S410. That is, the resource release command sent by the AMF to the RAN includes a session modification response message (the session modification accept message or the session modification refuse message) or a session establishment response message (the session establishment accept message and the session establishment refuse message). The RAN sends the session modification response message or the session establishment response message to the UE in a resource releasing process. This is not limited in this embodiment of this application.

As shown in FIG. 6A and FIG. 6B, a session processing method in this scenario includes but is not limited to the following steps.

S501: The UE sends a session modification request message or a session establishment request message to the SMF when a quantity of sessions of the UE that each have an activated user plane connection is not less than a quantity threshold. For the session establishment request message, the session establishment request message may include the indication (namely, the indication information) of using the control plane optimization, to indicate the SMF to reestablish a first session to a session using control plane CIoT optimization and not using N3 data transmission. For the session modification request message, the session modification request message may include the indication (namely, the indication information) of using the control plane optimization, to indicate the SMF to modify the first session to a session using control plane CIoT optimization and not using N3 data transmission.

The session modification request message or the session establishment request message may correspond to one first session. For example, the session modification request message or the session establishment request message may include a session ID of the corresponding first session.

In a possible design, the indication of using the control plane optimization may be a newly added value in an existing information element. For example, the indication information may be a newly added cause value in a session modification cause value in the session modification request message, where the cause value is used to indicate to modify the first session to a session using the control plane optimization.

In another possible design, the indication information may alternatively be a newly added information element, for example, a user plane connection deactivation request (UPDR). The information element may include one bit. The bit is 0 or 1. The bit is used to indicate whether to modify or reestablish the first session to the session using the control plane optimization.

Optionally, the bit 0 may indicate not to modify or reestablish the first session to the session using the control plane optimization, that is, not to deactivate a user plane connection of the first session. The bit 1 may indicate to modify or reestablish the first session to the session using the control plane optimization, that is, to deactivate the user plane connection of the first session. Certainly, alternatively, the bit 0 may indicate to modify or reestablish the first session to the session using the control plane optimization, and the bit 1 may indicate not to modify or reestablish the first session to the session using the control plane optimization. This is not limited in this embodiment of this application. Herein, an example in which the bit 0 indicates not to modify or reestablish the first session to the session using the control plane optimization, and the bit 1 indicates to modify or reestablish the first session to the session using the control plane optimization. For example, the bit 0 may be a default value. If the first session needs to be modified or reestablished to the session using the control plane optimization, a bit of the information element only needs to be set to 1.

Optionally, the session modification request message or the session establishment request message may be included in an uplink NAS transport message and sent to the AMF. The AMF invokes a session context update (for example, UpdateSMContext) service operation of a service-oriented interface (for example, Nsmf_PDUSession) of the SMF, and sends a session context update message to the SMF, where the session context update message includes the session modification request message or the session establishment request message.

In a possible implementation, after receiving the indication (namely, the indication information) of using the control plane optimization, the AMF may determine whether the first session can be modified or reestablished to the session using the control plane CIoT optimization and not using the N3 data transmission. If the control plane CIoT optimization may be used and the N3 data transmission is not used, the control plane optimization indication is sent to the SMF. If the control plane CIoT optimization cannot be used and the N3 data transmission is not used, the AMF sends, to the UE by using a downlink NAS transfer message, information sent by the UE, and carries cause value information of forwarding disabled. The cause value information includes but is not limited to the following: 1. Control plane congestion occurs. 2. A quantity of sessions using the control plane optimization has reached a maximum value. 3. A network side does not support the control plane optimization. 4. Another possible cause.

Correspondingly, the SMF receives the session modification request message or the session establishment request message, and modifies or reestablishes, based on the indication information, the first session to the session using the control plane CIoT optimization and not using the N3 data transmission.

Optionally, in some optional scenarios, for example, in a scenario in which a RAT type of a RAN accessed by the UE is handed over from a non-NB-IoT to an NB-IoT, the SMF determines, based on one or more of a local policy, a network configuration, or user subscription data, to release a session. If the first session requested to be modified or reestablished in the indication (namely, the indication information) of using the control plane optimization matches the session to be released by the SMF, the SMF may not modify or reestablish, based on the indication information, the first session to the session using the control plane CIoT optimization and not using the N3 data transmission, but release the first session.

Optionally, in some optional scenarios, the SMF determines, based on one or more of a local policy, a network configuration, or user subscription data, whether the first session can be modified or reestablished to the session using the control plane CIoT optimization and not using the N3 data transmission. If the SMF determines that the first session cannot be modified or reestablished to the session using the control plane CIoT optimization and not using the N3 data transmission, the SMF may alternatively not modify or reestablish, based on the indication information, the first session to the session using the control plane CIoT optimization and not using the N3 data transmission, and returns cause value information of that the first session cannot be modified or reestablished to the session using the control plane CIoT optimization and not using the N3 data transmission. The cause value information may include but is not limited to: 1. The control plane congestion occurs. 2. The quantity of sessions using the control plane optimization has reached the maximum value. 3. The network side does not support the using of the control plane optimization. 4. The another possible cause.

Optionally, in some optional scenarios, the SMF determines, based on one or more of a local policy, a network configuration, or user subscription data, that the user plane connection of the first session cannot be deactivated, and another session is deactivated. Returned cause value information of that the user plane connection of the first session cannot be deactivated includes but is not limited to the following: 1. Deactivation of the user plane connection is not allowed. 2. A user plane connection of the another session is deactivated.

When modifying or reestablishing the first session to the session using the control plane CIoT optimization and not using the N3 data transmission, the SMF may release or not release a UPF used as an N3 termination point. Releasing the UPF used as the N3 termination point means that an N3 tunnel of the first session no longer exists after the UPF is released. In this embodiment, if the UPF used as the N3 termination point is released, steps S502 to S505 are performed; or if the UPF used as the N3 termination point is not released, steps S506 and S507 are performed. Details are separately described below.

S502: The SMF sends an N4 session release request to the UPF used as the N3 termination point.

S503: After the N3 termination point is released, the UPF used as the N3 termination point sends an N4 session release response to the SMF.

S504 and S505: The SMF initiates an N4 session modification procedure to a UPF not used as the N3 termination point, to indicate the UPF not used as the N3 termination point to remove N9 tunnel information of a specified first session.

S506 and S507: The SMF initiates the N4 session modification procedure to the UPF used as the N3 termination point, to indicate the UPF used as the N3 termination point to remove N3 tunnel information of the specified first session.

S508: The SMF sends a session context update response message to the AMF, where the session context update response message includes N1 SM information (where the N1 SM information is session-related information sent by the SMF to the UE). The N1 SM information includes user plane connection deactivation result information, and the user plane connection deactivation result information indicates successful or unsuccessful deactivation of the user plane connection of the requested first session. In this embodiment, the successful deactivation may be understood as that the first session is successfully modified or reestablished to the session using the control plane CIoT optimization and not using the N3 data transmission. The unsuccessful deactivation may be understood as that the first session is unsuccessfully modified or reestablished to the session using the control plane CIoT optimization and not using the N3 data transmission. It should be noted that the unsuccessful modification or reestablishment herein may be understood as that the first session cannot be modified or reestablished, based on the local policy, the user subscription data, the network configuration, or the like, to the session using the control plane CIoT optimization and not using the N3 data transmission. Certainly, it may alternatively be understood as that a problem occurs in a process of modifying or establishing the first session to the session using the control plane CIoT optimization and not using the N3 data transmission. Consequently, the modification or the reestablishment cannot succeed.

Optionally, if the deactivation succeeds, the session context update response message includes the N1 SM information, where the N1 SM information includes a session modification accept message or a session establishment accept message, the session modification accept message or the session establishment accept message includes the user plane connection deactivation result information, and the user plane connection deactivation result information indicates that the requested first session is successfully modified or reestablished to the session using the control plane CIoT optimization and not using the N3 data transmission.

Further, the session context update response message may further include N2 SM information (session-related information sent by the SMF to the RAN), where the N2 SM information indicates the RAN to release a resource related to the first session, including a DRB between the UE and the RAN and the N3 tunnel between the RAN and the UPF.

Optionally, if the deactivation does not succeed, for example, if the first session for which the terminal device requests to deactivate the user plane connection matches the session that the SMF determines to release, the session context update response message includes the N1 SM information, where the N1 SM information includes a session modification refuse message or a session establishment refuse message, the session modification refuse message or the session establishment refuse message includes the user plane connection deactivation result information, and the user plane connection deactivation result information indicates that the requested first session is unsuccessfully modified or reestablished to the session using the control plane CIoT optimization and not using the N3 data transmission.

Further, the session modification refuse message or the session establishment refuse message may further include cause value information of modification refuse or establishment refuse. The cause value information may include but is not limited to the following: 1. The control plane congestion occurs. 2. The quantity of sessions using the control plane optimization has reached the maximum value. 3. The network side does not support the using of the control plane optimization. 4. The SMF needs to release the session. 5.

The deactivation of the user plane connection is not allowed. 6. The user plane connection of the another session is deactivated, and so on.

It may be understood that, alternatively, the session modification refuse message or the session establishment refuse message may include the user plane connection deactivation result information used to indicate the successful deactivation of the first session, and the session modification acceptation message or the session establishment acceptation message includes the user plane connection deactivation result information used to indicate the unsuccessful deactivation of the first session. This is not limited in this embodiment of this application.

S509: The AMF forwards the received N2 SM information to the RAN through an N2 interface, that is, sends a resource release command to the RAN.

S510: After receiving the resource release command, the RAN releases resources on a Uu interface and an N3 interface, that is, releases a DRB resource and an N3 tunnel resource.

S511: After releasing the resources, the RAN sends a resource release response to the AMF. If resources of a plurality of sessions need to be released, the AMF may send the received session modification accept message, session modification refuse message, session establishment accept message, or session establishment refuse message to the UE after receiving resource release responses of all the sessions.

S512: The AMF sends the received session modification accept message, session modification refuse message, session establishment accept message, or session establishment refuse message to the UE, where the message includes the user plane connection deactivation result information. If the user plane connection deactivation result information indicates that the unsuccessful deactivation of the user plane connection of the first session, the message may further include cause value information of the unsuccessful deactivation. The cause value information is, for example, the following: 1. The control plane congestion occurs. 2. The quantity of sessions using the control plane optimization has reached the maximum value. 3. The network side does not support the using of the control plane optimization. 4. The SMF needs to release the session. 5. The deactivation of the user plane connection is not allowed. 6. The user plane connection of the another session is deactivated.

It may be understood that step S512 may alternatively be integrated into steps S509 and S510. That is, the resource release command sent by the AMF to the RAN includes a session modification response message (the session modification accept message or the session modification refuse message) or a session establishment response message (the session establishment accept message and the session establishment refuse message). The RAN sends the session modification response message or the session establishment response message to the UE in a resource releasing process. This is not limited in this embodiment of this application.

The methods provided in embodiments of this application are described above in detail with reference to FIG. 2 to FIG. 6B. Apparatuses provided in embodiments of this application are described below in detail with reference to FIG. 7 to FIG. 10.

Figure 7:
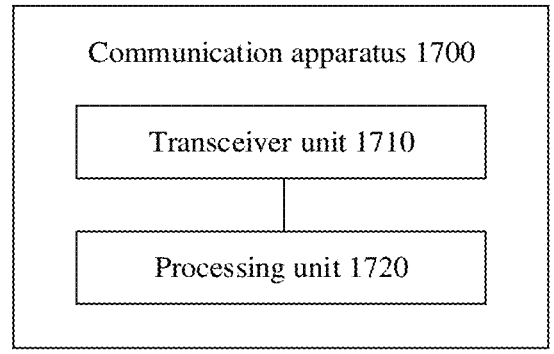
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 1700 may include a transceiver unit 1710 and a processing unit 1720. The transceiver unit 1710 and the processing unit 1720 may be software, hardware, or a combination of the software and the hardware.

The transceiver unit 1710 may include a sending unit and a receiving unit. The sending unit is configured to implement a sending function, the receiving unit is configured to implement a receiving function, and the transceiver unit 1710 may implement the sending function and/or the receiving function. The transceiver unit may alternatively be described as a communication unit.

Optionally, the transceiver unit 1710 may be configured to receive information (or a message) sent by another apparatus, and may be further configured to send information (or a message) to the another apparatus. The processing unit 1720 may be configured to perform internal processing of the apparatus.

In a possible design, the communication apparatus 1700 may correspond to the terminal device (for example, the UE) in the foregoing method embodiments. For example, the communication apparatus 1700 may be a terminal device, or may be a chip in the terminal device. The communication apparatus 1700 may include units configured to perform the operations performed by the terminal device in the foregoing method embodiments. In addition, the units in the communication apparatus 1700 are separately configured to perform the operations performed by the terminal device in the foregoing method embodiments.

For example, the processing unit 1720 is configured to: when a quantity of sessions of the terminal device that each have an activated user plane connection is not less than a quantity threshold, determine to deactivate a user plane connection of at least one first session, where the sessions that each have the activated user plane connection include the at least one first session.

The transceiver unit 1710 is configured to send a first request message to a first network element, where the first request message includes indication information, and the indication information indicates to deactivate the user plane connection of the at least one first session.

In a possible design, the communication apparatus 1700 may correspond to the session management network element (for example, the SMF) in the foregoing method embodiments. For example, the communication apparatus 1700 may be a session management network element, or may be a chip in the session management network element. The communication apparatus 1700 may include units configured to perform the operations performed by the session management network element in the foregoing method embodiments. In addition, the units in the communication apparatus 1700 are separately configured to perform the operations performed by the session management network element in the foregoing method embodiments.

For example, the transceiver unit 1710 is configured to receive a request message, where the request message includes indication information, the indication information indicates the session management network element to deactivate a user plane connection of a first session, the first session belongs to sessions of a terminal device that each have an activated user plane connection, and a quantity of the sessions of the terminal device that each have the activated user plane connection is not less than a quantity threshold.

The processing unit 1720 is configured to deactivate the user plane connection of the first session based on the indication information.

In a possible design, the communication apparatus 1700 may correspond to the mobility management network element (for example, the AMF) in the method embodiment in FIG. 2. For example, the communication apparatus 1700 may be a mobility management network element, or may be a chip in the mobility management network element. The communication apparatus 1700 may include units configured to perform the operations performed by the mobility management network element in the foregoing method embodiment in FIG. 2. In addition, the units in the communication apparatus 1700 are separately configured to perform the operations performed by the mobility management network element in the foregoing method embodiment.

In a possible design, the communication apparatus 1700 may correspond to the access network device (for example, the RAN) in the method embodiments in FIG. 4A to FIG. 6B. For example, the communication apparatus 1700 may be an access network device, or may be a chip in the access network device. The communication apparatus 1700 may include units configured to perform the operations performed by the access network device in the foregoing method embodiments in FIG. 4A to FIG. 6B. In addition, the units in the communication apparatus 1700 are separately configured to perform the operations performed by the access network device in the foregoing method embodiments.

Figure 8:
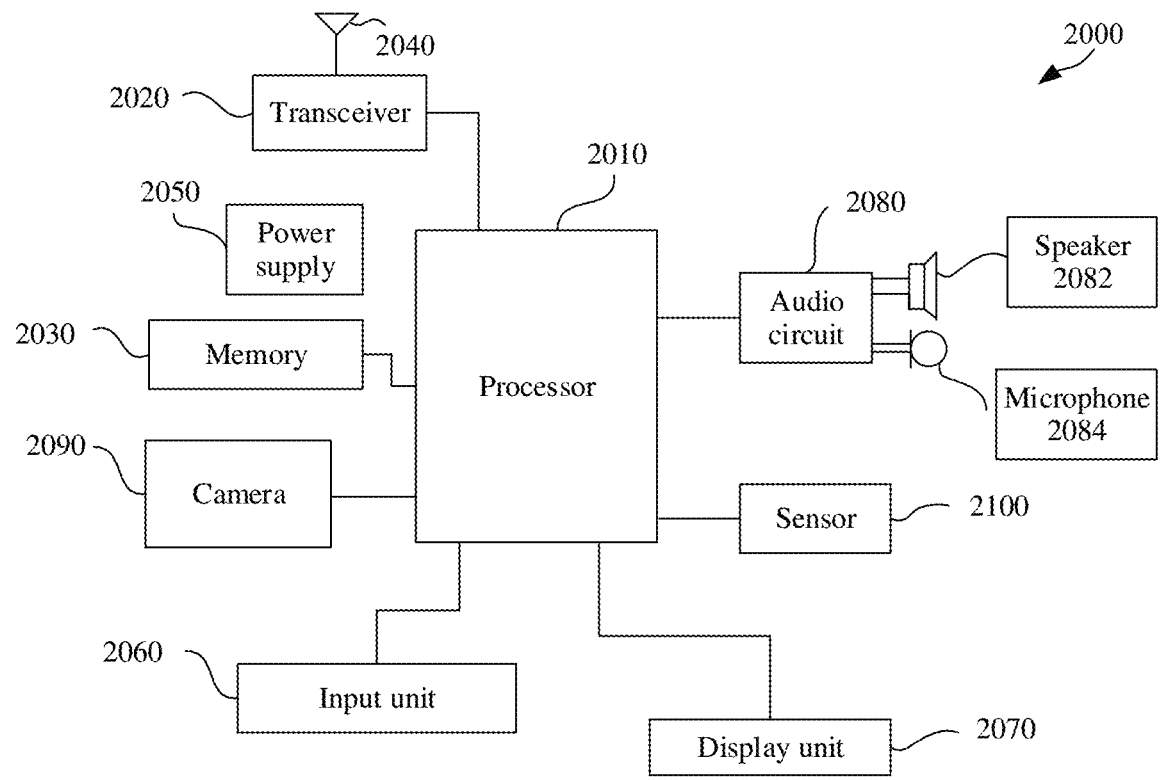
FIG. 8 is a schematic diagram of a structure of a terminal device according to an embodiment of this application.

It should be understood that, when the communication apparatus 1700 is the UE, the transceiver unit 1710 in the communication apparatus 1700 may correspond to a transceiver 2020 in a terminal device 2000 shown in FIG. 8, and the processing unit 1720 in the communication apparatus 1700 may correspond to a processor 2010 in the terminal device 2000 shown in FIG. 8.

It should be further understood that, when the communication apparatus 1700 is a chip disposed in the UE, the transceiver unit 1710 in the communication apparatus 1700 may be an input/output interface.

Figure 9:
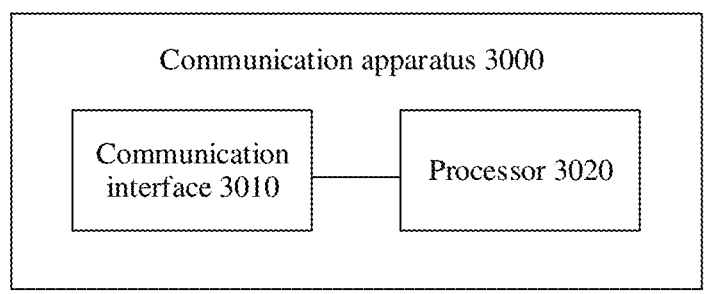
FIG. 9 is a schematic block diagram of another communication apparatus according to an embodiment of this application.

It should be understood that when the communication apparatus 1700 corresponds to the session management network element or the mobility management network element, the transceiver unit 1710 in the communication apparatus 1700 may correspond to a communication interface 3010 shown in FIG. 9, and the processing unit 1720 may correspond to a processor 3020 shown in FIG. 9.

FIG. 8 is a schematic diagram of a structure of a terminal device 2000 according to an embodiment of this application. The terminal device 2000 may be used in the system shown in FIG. 1, to perform a function of the terminal device (or the UE) in the foregoing method embodiments. As shown in FIG. 8, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the transceiver unit in FIG. 7. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 8 can implement processes related to the terminal device in any one of the foregoing method embodiments. Operations or functions of the modules in the terminal device 2000 are respectively intended to implement corresponding procedures in the foregoing method embodiments. For details, refer to the descriptions in the foregoing method embodiments. To avoid repetition, detailed descriptions are appropriately omitted herein.

The processor 2010 may be configured to perform an action implemented inside the terminal device in the foregoing method embodiments, and the transceiver 2020 may be configured to perform an action of sending by the terminal device to the network side or receiving from the network side in the foregoing method embodiments. For details, refer to the descriptions in the foregoing method embodiments. Details are not described herein again.

Optionally, the terminal device 2000 may further include a power supply 2050 configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 9 is a schematic diagram of a structure of a communication apparatus according to an embodiment of this application. It should be understood that the communication apparatus 3000 shown in FIG. 9 is merely an example. The communication apparatus in this embodiment of this application may further include other modules or units, may include modules having functions similar to those of modules in FIG. 9, or may not necessarily include all modules in FIG. 9.

The communication apparatus 3000 includes a communication interface 3010 and at least one processor 3020.

The communication apparatus 3000 may correspond to any network element in a session management network element, a mobility management network element, a terminal device, and an access network device. The at least one processor 3020 executes program instructions, to enable the communication apparatus 3000 to implement the corresponding procedure of the method performed by the corresponding network element in the foregoing method embodiments.

Optionally, the communication apparatus 3000 may further include a memory. The memory may store the program instructions, and the at least one processor 3020 may read the program instructions stored in the memory, and execute the program instructions.

Figure 10:
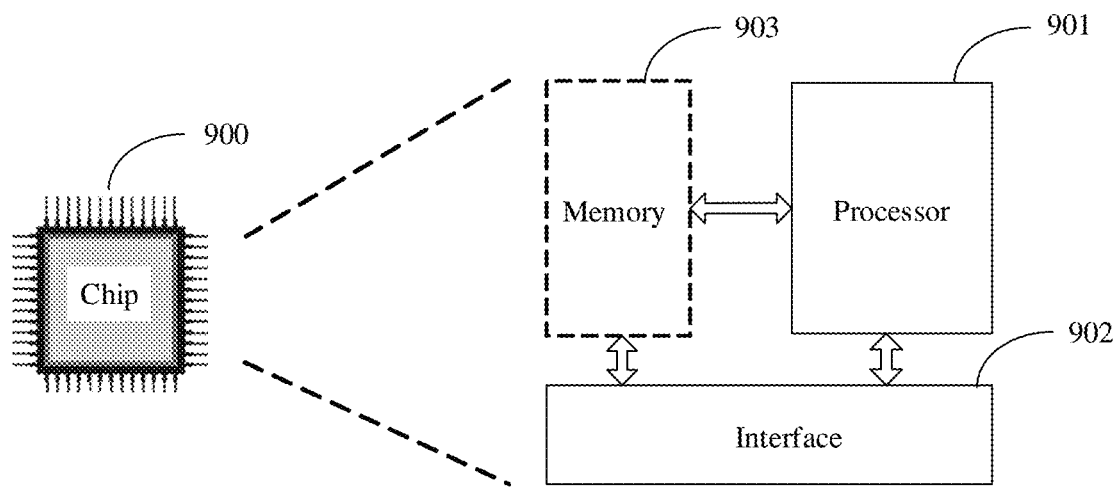
FIG. 10 is a schematic diagram of a structure of a chip according to an embodiment of this application.

When the communication apparatus may be a chip or a chip system, refer to a schematic diagram of a structure of a chip shown in FIG. 10. The chip 900 shown in FIG. 10 includes a processor 901, and an interface 902. There may be one or more processors 901 and a plurality of interfaces 902. It should be noted that a function corresponding to each of the processor 901 and the interface 902 may be implemented by using a hardware design, may be implemented by using a software design, or may be implemented by combining software and hardware. This is not limited herein.

In a possible design, when the chip is configured to implement the functions of the terminal device in embodiments of this application: The processor 901 is configured to: when a quantity of sessions of the terminal device that each have an activated user plane connection is not less than a quantity threshold, determine to deactivate a user plane connection of at least one first session, where the sessions that each have the activated user plane connection include the at least one first session.

The interface 902 is configured to send a first request message to a first network element, where the first request message includes indication information, and the indication information indicates to deactivate the user plane connection of the at least one first session.

Optionally, the chip further includes a memory 903. The memory 903 is configured to store program instructions and data that are necessary for the terminal device.

When the chip is configured to implement the functions of the session management network element in embodiments of this application: The interface 902 is configured to receive a request message, where the request message includes indication information, the indication information indicates the session management network element to deactivate a user plane connection of a first session, the first session belongs to sessions of a terminal device that each have an activated user plane connection, and a quantity of the sessions of the terminal device that each have the activated user plane connection is not less than a quantity threshold.

The processor 901 is configured to deactivate the user plane connection of the first session based on the indication information.

Optionally, the chip further includes a memory 903. The memory 903 is configured to store program instructions and data that are necessary for the session management network element.

The processor in this embodiment of this application may be a central processing unit (CPU), or the processor may be another general-purpose processor, a digital signal processor (DSP), an application specific integrated circuit (ASIC), a field programmable gate array (FPGA), another programmable logic device, a discrete gate or a transistor logic device, a discrete hardware component, or the like. The general-purpose processor may be a microprocessor, or the processor may be any conventional processor or the like.

According to the methods provided in embodiments of this application, this application further provides a computer program product. The computer program product includes computer program code. When the computer program code is run on a computer, the computer is enabled to execute the method on the terminal device side, the method on the access and mobility management network side, or the method on the session management network element side in any one of the foregoing method embodiments.

In another embodiment of this application, a communication system is further provided. The communication system includes a terminal device and a session management network element. Alternatively, the communication system includes a terminal device, a session management network element, and a mobility management network element. Alternatively, the communication system includes a terminal device, a session management network element, a mobility management network element, and an access network device. For example, the terminal device may be the terminal device provided in FIG. 2 to FIG. 6B, and is configured to perform the steps of the terminal device in the session processing methods provided in FIG. 2 to FIG. 6B; and/or the session management network element may be the session management network element provided in FIG. 2 to FIG. 6B, and is configured to perform the steps of the session management network element in the session processing methods provided in FIG. 2 to FIG. 6B.

An embodiment of this application further provides a processing apparatus, including a processor and an interface. The processor is configured to perform the method in any one of the foregoing method embodiments.

It should be understood that the processing apparatus may be a chip. For example, the processing apparatus may be a FPGA, may be a general-purpose processor, a DSP, an ASIC, the FPGA, another programmable logic device, a discrete gate, a transistor logic device, or a discrete hardware component, may be a system on chip (SoC), may be a CPU, may be a network processor (NP), may be a DSP, may be a micro controller unit (MCU), or may be a programmable controller (PLD) or another integrated chip. The processing apparatus may implement or perform the methods, the steps, and the logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that the memory in embodiments of this application may be a volatile memory or a nonvolatile memory, or may include both the volatile memory and the nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include but is not limited to these memories and any memory of another appropriate type.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, or a computer. As illustrated by using figures, both a computing device and an application that runs on the computing device may be components. One or more components may reside within a process or a thread of execution, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, in a distributed system, or across a network such as the internet interacting with another system by using the signal).

It should be understood that, an "embodiment" mentioned throughout this specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in embodiments of this application, "B corresponding to A" indicates that B is associated with A, and B may be determined based on A. However, it should be further understood that determining B based on A does not mean that B is determined based only on A. That is, B may also be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in embodiments of this application, the session management network element and/or the terminal device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

A person of ordinary skill in the art may be aware that, in combination with the examples described in embodiments disclosed in this specification, units and algorithm steps can be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in the computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   when a quantity of sessions of a terminal device that each have an activated user plane connection is greater than or equal to a quantity threshold, determining, by the terminal device, to deactivate a user plane connection of at least one first session, wherein the sessions that each have the activated user plane connection comprise the at least one first session; and
   sending, by the terminal device, a first request message to a first network element, wherein the first request message comprises indication information, and the indication information indicates to deactivate the user plane connection of the at least one first session.

2. The method according to claim 1, wherein the when the quantity of sessions of the terminal device that each have the activated user plane connection is greater than or equal to the quantity threshold, determining, by the terminal device, to deactivate the user plane connection of the at least one first session comprises:
   when the terminal device is handed over from accessing a network over a non-narrow band internet of things connection to accessing the network over a narrow band internet of things connection, and the quantity of sessions of the terminal device that each have the activated user plane connection is greater than the quantity threshold, determining, by the terminal device, to deactivate the user plane connection of the at least one first session.

3. The method according to claim 1, wherein when the quantity of sessions of the terminal device that each have the activated user plane connection is greater than or equal to the quantity threshold, determining, by the terminal device, to deactivate the user plane connection of the at least one first session comprises:
   when the quantity of sessions of the terminal device that each have the activated user plane connection is greater than or equal to the quantity threshold, and the terminal device determines to activate a user plane connection for at least one second session, determining, by the terminal device, to deactivate the user plane connection of the at least one first session, wherein the at least one second session has no activated user plane connection.

4. The method according to claim 1, wherein the indication information indicating to deactivate the user plane connection of the at least one first session comprises the indication information indicating to modify the at least one first session to a session using control plane optimization.

5. The method according to claim 1, wherein the first network element is a mobility management network element, and the first request message is a registration request message or a service request message.

6. The method according to claim 1, wherein the first network element is a session management network element, and the first request message is a session establishment request message or a session modification request message.

7. The method according to claim 1, wherein the terminal device accesses the network over a narrow band internet of things connection.

8. The method according to claim 1, wherein the first session does not comprise a session for sending an abnormal data report.

9. The method according to claim 1, further comprising:
   receiving, by a session management network element, the first request message comprising the indication information; and
   deactivating, by the session management network element, the user plane connection of the at least one first session based on the indication information.

10. The method according to claim 9, wherein deactivating, by the session management network element, the user plane connection of the first session based on the indication information comprises:
    modifying, by the session management network element based on the indication information, the first session to a session using control plane optimization.

11. The method according to claim 9, wherein before deactivating, by the session management network element, the user plane connection of the first session based on the indication information, the method further comprises:

determining, by the session management network element based on one or more of a local policy, a network configuration, or user subscription data, to deactivate the user plane connection of the first session.

12. The method according to claim 9, further comprising:
sending, by the session management network element, a response message, wherein the response message comprises user plane connection deactivation result information of the first session, and the user plane connection deactivation result information indicates successful or unsuccessful deactivation of the user plane connection of the first session.

13. The method according to claim 12, wherein the user plane connection deactivation result information indicates the unsuccessful deactivation of the user plane connection of the first session, and the response message further comprises cause value information of the unsuccessful deactivation of the user plane connection.

14. The method according to claim 13, wherein the cause value information comprises one or more of the following information: control plane congestion occurs, a quantity of sessions using control plane optimization reaches a maximum value, a network does not support the control plane optimization, deactivation of the user plane connection is not allowed, or a user plane connection of another session is deactivated.

15. A communication apparatus, used in a terminal device, wherein the apparatus comprises:
a processor, configured to:
when a quantity of sessions of the terminal device that each have an activated user plane connection is greater than or equal to a quantity threshold, determine to deactivate a user plane connection of at least one first session, wherein the sessions that each have the activated user plane connection comprise the at least one first session; and
a transceiver, configured to send a first request message to a first network element, wherein the first request message comprises indication information, and the indication information indicates to deactivate the user plane connection of the at least one first session.

16. The apparatus according to claim 15, wherein the processor is configured to:
when the terminal device is handed over from accessing a network over a non-narrow band internet of things connection to accessing the network over a narrow band internet of things connection, and the quantity of sessions of the terminal device that each have the activated user plane connection is greater than the quantity threshold, determine to deactivate the user plane connection of the at least one first session.

17. The apparatus according to claim 15, wherein the processor is configured to:
when the quantity of sessions of the terminal device that each have the activated user plane connection is greater than or equal to the quantity threshold, and the terminal device determines to activate a user plane connection for at least one second session, determine to deactivate the user plane connection of the at least one first session, wherein the at least one second session has no activated user plane connection.

18. The apparatus according to claim 15, wherein that the indication information indicating to deactivate the user plane connection of the at least one first session comprises the indication information indicating to modify the at least one first session to a session using control plane optimization.

19. The apparatus according to claim 15, wherein the terminal device accesses the network over a narrow band internet of things connection.

20. A method, comprising:
when a quantity of sessions of a terminal device that each have an activated user plane connection is greater than or equal to a quantity threshold, determining, by the terminal device, to deactivate a user plane connection of at least one first session, wherein the sessions that each have the activated user plane connection comprise the at least one first session;
sending, by the terminal device, a first request message, wherein the first request message comprises indication information, and the indication information indicates to deactivate the user plane connection of the at least one first session;
receiving, by a session management network element from the terminal device, the first request message comprising the indication information; and
deactivating, by the session management network element, the user plane connection of the first session based on the indication information.

* * * * *